(12) United States Patent
Nejezchleb

(10) Patent No.: US 10,987,542 B2
(45) Date of Patent: Apr. 27, 2021

(54) INTELLIGENT SYSTEM AND APPARATUS PROVIDING PHYSICAL ACTIVITY FEEDBACK

(71) Applicant: Jason Nejezchleb, Fletcher, NC (US)

(72) Inventor: Jason Nejezchleb, Fletcher, NC (US)

(*) Notice: Subject to any disclaimer, the term of this patent is extended or adjusted under 35 U.S.C. 154(b) by 188 days.

(21) Appl. No.: 15/376,308

(22) Filed: Dec. 12, 2016

(65) Prior Publication Data

US 2018/0161623 A1 Jun. 14, 2018

(51) Int. Cl.
*A63B 24/00* (2006.01)
*A63B 71/06* (2006.01)
*G06K 9/00* (2006.01)

(52) U.S. Cl.
CPC ...... *A63B 24/0006* (2013.01); *A63B 71/0622* (2013.01); *G06K 9/00342* (2013.01); *G06K 9/00536* (2013.01); *A63B 2024/0009* (2013.01); *A63B 2071/0655* (2013.01); *A63B 2071/0661* (2013.01); *A63B 2220/803* (2013.01)

(58) Field of Classification Search
CPC .................. A63B 24/0006; A63B 71/0622
See application file for complete search history.

(56) References Cited

U.S. PATENT DOCUMENTS

| | | | |
|---|---|---|---|
| 10,065,074 B1 * | 9/2018 | Hoang | A63B 24/0003 |
| 2005/0021292 A1 * | 1/2005 | Vock | A42B 3/0433 |
| | | | 702/182 |
| 2007/0208530 A1 * | 9/2007 | Vock | A42B 3/0433 |
| | | | 702/141 |
| 2009/0062092 A1 * | 3/2009 | Mortimer | A63B 24/00 |
| | | | 482/142 |
| 2010/0117837 A1 * | 5/2010 | Stirling | A61B 5/1127 |
| | | | 340/573.1 |
| 2010/0286571 A1 * | 11/2010 | Allum | A61B 5/1116 |
| | | | 600/595 |
| 2010/0312297 A1 * | 12/2010 | Volpe | A61B 5/0404 |
| | | | 607/6 |
| 2013/0211772 A1 * | 8/2013 | Ross, Jr. | A61B 5/6831 |
| | | | 702/141 |
| 2014/0278218 A1 * | 9/2014 | Chang | A61B 5/1114 |
| | | | 702/150 |
| 2016/0038083 A1 * | 2/2016 | Ding | A61B 5/6804 |
| | | | 600/388 |

* cited by examiner

*Primary Examiner* — Omkar A Deodhar
(74) *Attorney, Agent, or Firm* — John L. Sotomayor

(57) ABSTRACT

This document presents a system and method for using an intelligent belt and a remote secondary sensor to obtain instantaneous feedback during the performance of physical activities. A remote secondary sensor may be attached to a conveyance associated with, and in use by, a user. The intelligent belt uses a position sensor, such as a 3-axis accelerometer, to monitor the movements of a user and a conveyance such as an athletic apparatus, or any other apparatus upon which a user may stand, move, or with which the user may be associated. The belt is capable of determining when certain physical activities are not being performed properly in comparison to a preferred and pre-configured performance, and can provide real-time feedback using visual, aural, haptic, and other feedback mechanisms.

18 Claims, 15 Drawing Sheets

INTELLIGENT SYSTEM AND APPARATUS PROVIDING PHYSICAL ACTIVITY FEEDBACK

COPYRIGHT NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever.

BACKGROUND

Various types of training aids for physical activities (such as sporting events) are known in the prior art. Frequently they focus on making a video recording of a person performing a specific task (such as swinging a golf club, swinging a tennis racket, or swinging a baseball bat) and then analyzing the video after the fact. Some of these methods even require that the person performing the task wear special clothing or place reflectors at specific locations on their body. Some focus on measuring body movement within a specific plane but do not analyze three-dimensional motions.

Training systems may provide for data collection from sensors mounted on a person or collect data from sensors associated with an object or device used in training. The data collected is used for review both in a subjective manner by a coach or in a more objective manner by comparing the recorded data from a user against a pre-recorded performance by a user who is much more experienced in the activity the user is attempting to learn.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which.

DETAILED DESCRIPTION

Figure 1:
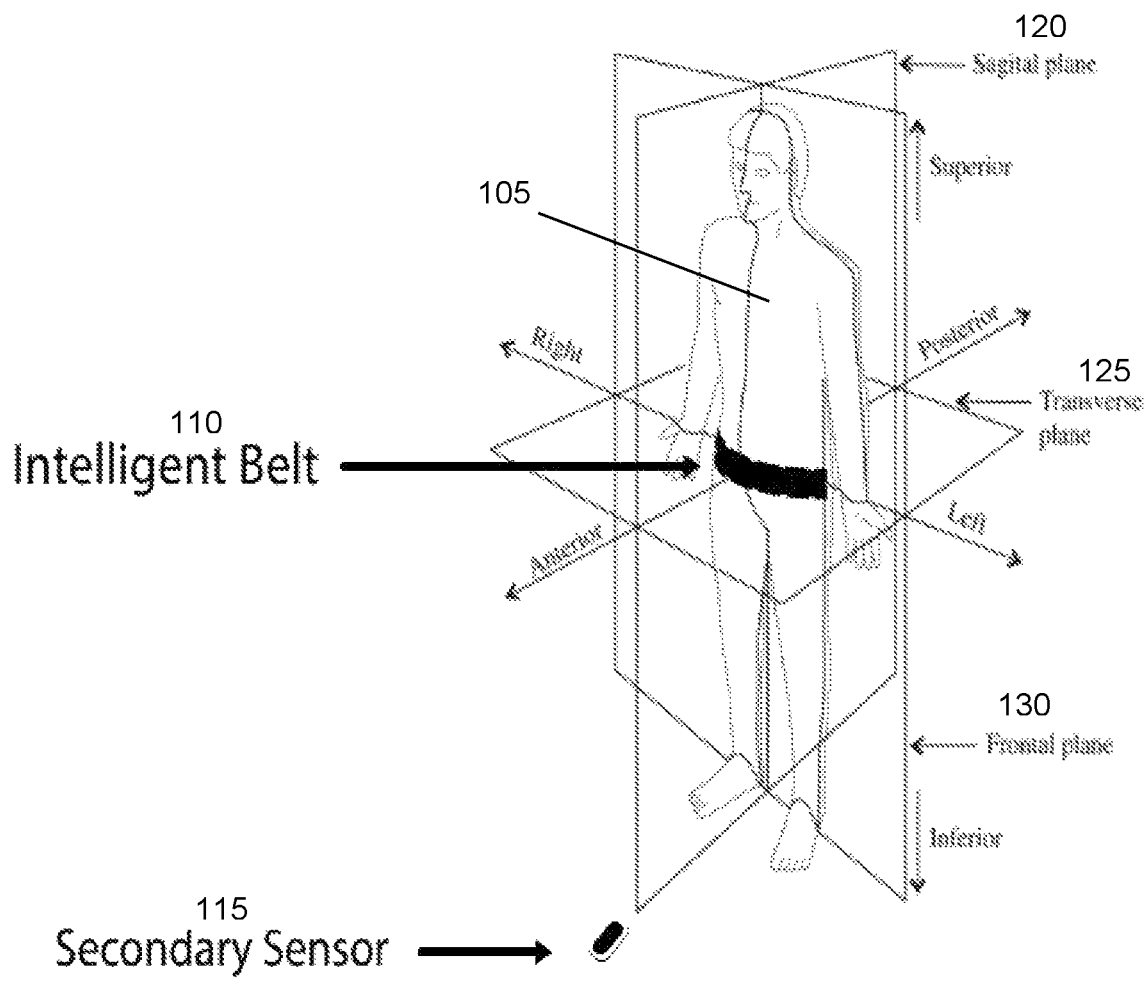
FIG. 1 is a view showing some spatial relationships between a user wearing an intelligent belt, a secondary sensor, and anatomical planes consistent with certain embodiments of the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically.

Reference throughout this document to "one embodiment", "certain embodiments", "an embodiment" or similar terms means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments without limitation.

Throughout this document the use of the word "or" is inclusive unless otherwise stated. For example, "an indicator viewable by the user or by a coach" does not preclude the possibility that the indicator is viewable by both the user and a coach.

Throughout this document the term "position' refers to a substantially static placement of certain body parts such as hands, feet, arms, legs, torso, neck, and head with regard to all parameters.

Throughout this document the term "motion" refers to a change of position over time. Motion may also sometimes referred to as "movement". Throughout this document the term "parameter" refers to a measured aspect of a position or motion including, but not limited to, placement in 3-dimensional space, orientation, speed, direction, angle of attack, timing, etc.

Throughout this document the term "maneuver" refers to a sequence of positions and/or motions used to accomplish a simple task. In the context of this invention, non-limiting examples of maneuvers may include sitting down, standing up, leaning forward, walking, and so on.

Throughout this document the term "drill" refers to a sequence of maneuvers used to accomplish a more complex task. In the context of this invention non-limiting examples of drills may include a dance routine, a snowboard downhill run, a specific therapy exercise, and so on.

Throughout this document the term "activity" refers to a physical activity for which a set of drills may be defined. In the context of this invention non-limiting examples of activities may include snowboarding, skiing, gymnastics, dance, physical therapy, and so on.

Throughout this document the term "conveyance" refers to an object which an individual is in contact with (constantly or intermittently) while participating in an activity.

Throughout this document the term "deviation" refers to a single or collective set of differences between a perfect position or motion and a performed position or motion as determined by comparing parameters of the perfect position/motion with parameters of the performed position/motion.

Throughout this document the term "tolerance" refers to a maximum allowable deviation from a perfect position or motion.

Throughout this document the term "performance" (or "performed") refers to actual positions or motions that a user completed (or is currently engaged in) while participating in an activity.

Throughout this document the term "perfect" refers to a position or motion that exactly matches the ideal position or motion in all parameters. A perfect performance has zero deviation from ideal in all parameters.

Throughout this document the term "acceptable" refers to a performed position or motion where no parameters deviate from perfect by more than the allowable tolerance for that position or motion.

Throughout this document the term "unacceptable" refers to a performed position of motion where at least one parameter deviates from perfect by more than the tolerance allowed for the position or motion.

Throughout this document the term "transition" refers to the temporal boundary between two consecutive positions or motions.

Throughout this document the term "feedback" refers to an indication to a user or an observer of how successfully a task was completed. Feedback indicating that a position or motion as completed within acceptable limits is called positive feedback. Feedback indicating that the position or motion was not completed within acceptable limits is called negative feedback. Both positive feedback and negative feedback can vary as to the degree and methodology of delivery.

Throughout this document the term "configuration" refers to information that is stored in some form of computer memory (including, but not limited to, volatile or non-volatile computer memory subsystems, processor registers, a fixed disk drive, and so on). A configuration can describe the specifics of how a motion, position, maneuver, or drill should be performed or how and when feedback should be delivered.

What is needed is a training aid for physical activities that can collect and analyze three dimensional movements of both a person and a conveyance associated with a particular physical activity and provide real-time feedback to the person so that their current performance of the physical activity can be immediately corrected.

The apparatus herein described may be embodied as a physical belt worn by the end user during physical activity. The belt comprises an elastic material that is worn like a belt in a position on the body that may be under the ilium, above the hips, and below the waist, a positional sensor such as, in a non-limiting example, a 3-axis accelerometer, at least one feedback mechanism, a controller, and at least one communication link to a remote secondary sensor. In an embodiment, additional positional sensors may be installed within the belt in place of or in addition to a 3-axis accelerometer such that the belt sensor apparatus is not limited to only the use of a 3-axis accelerometer to determine belt physical position. The belt is easily donned and removed, fits snugly, and stays in place during movement. The belt also resists damage from sweat and is easily cleaned.

A remote secondary sensor that is in communication with the belt may be attached to a conveyance associated with the physical activity, or may be attached to another belt worn by an instructor or trainer of the physical activity. The physical belt worn by the end user and the remote secondary sensor apparatus may form a comparison loop to provide the end user with real-time, and even streaming, feedback as to position of the end user with regard to a conveyance, or with regard to a coach, trainer, or instructor. The physical position and comparison data may be exported from the belt to an outside data repository.

The belt may also comprise a communication link to an external device such as a smart phone, tablet computer, or personal computer. In some embodiments, the communication link from the belt to the external device may be the same communication link used by belt to communicate with a remote secondary sensor. The outside data repository may be maintained on the smart phone, tablet computer, personal computer, local server, cloud server, or any other data storage repository with which the belt may be in communication. In an alternative embodiment, the secondary sensor may also establish and maintain a network communication channel with an outside device to provide collected data directly to the outside device for storage and analysis. In this embodiment, the belt and the secondary sensor may both provide data to the other device, as well as to an external system such as a data repository, local server, networked server, cloud-based server, network computer, laptop, smartphone, wearable device, or any other network access capable device.

The positional sensor, such as, in a non-limiting example, a 3-axis accelerometer, may be positioned on the belt so that the positional sensor sits on the lower spine and allows the controller to track the movements of the hips in 3-dimensional space. The belt is constructed and programmed to compare the actual position and orientation of the hips with an expectation of the hip position and orientation when a comparison is performed against an ideal or perfect hip position and orientation, or when the comparison is performed against the position of the secondary sensor associated with a conveyance or associated with a trainer, instructor, or other expert. The controller can detect deviations from expected hip position and orientation and, if the deviations are significant enough, provide immediate feedback to the user so that the user can make a timely correction.

In operation, the belt can be instructed to expect that user participation in a physical activity should result in specific positions or motions of the hips. By detecting when those motions and positions are being performed incorrectly and providing feedback to the user, the belt helps to improve hip position, body mechanics, posture and positioning of the user's center of gravity. This real-time, meaningful feedback provided during the activity and resulting in immediate correction by the user is not provided by video based training aids or post-instructional feedback.

Non-limiting examples of activities where the invention can provide meaningful feedback include rehabilitation and physical therapy, stretching, yoga, ballet and other dancing, gymnastics training, and board sports.

When the belt sensor apparatus determines that the user is performing an activity incorrectly and that the degree of error is such that an adjustment by the user is warranted, the belt may provide specific, real-time feedback to the user. The feedback mechanisms associated with the belt and used by the belt to inform the user may include visual feedback, audible feedback, and haptic feedback.

All movements, maneuvers and drills in the performance of a physical activity, regardless of any feedback, involve the dimension of time. Assembly of positions, movement, maneuvers and drills also require the assembly of activities over a span of time. These activities may occur sequentially across a time span or at a specific moment within a longer duration of time. In a non-limiting example, the first physical movement of a physical activity defined as a movement may have a duration of 5 seconds, followed by a physical position as physical activity two having a duration of 10 seconds, followed by a third portion of the physical activity comprising a drill having a duration of 15 seconds. In a sequential assembly these activities may assembled in sequential order, end-to-end, that would end up spanning 30 seconds.

Creating a non-stacked/non-sequential assembly of activities across a longer timeline, the activities are assigned to and initiated to points within the timeline. In a non-limiting example, if the same activities outlined above are defined within a 60 second timeline—movement one may be triggered at 5 seconds, position two may be triggered at 30 seconds; drill three may be triggered at 45 seconds. All activities triggered within a 60 second timeline. Timing positions may be set at particular locations within any time span defined for a physical activity, providing not only completely sequential physical movements, positions, and drills, but also physical movements, positions, and drills embedded within a time span defined for the learning activity overall.

Since movements, maneuvers and drills occur over time the system may provide mechanisms to synchronize activities that occur over time between an instructor and one or more followers. The following synchronization methods may be enabled.

Manual:
The simplest method enables the user to manually change from activity to activity in a sequence via a button on the belt or selection on a third party screen. An instructor in a ballet class may have a maneuver containing ordered positions. As the class advances the instructor manually selects the next position. This concept follows a simple next/back or any in the sequence user interface. This also applies to or subsets of movements, maneuvers or drills. Manual synchronization could also be driven by voice commands.

Visual:
Another method is to let the movement play out all of the activities per the assembled timeline. A third party screen may visually display the current activity, time left, upcoming movement and any other important information. This requires the addition of an image dimension to an activity.

Follow Me:
this method ensures the desired activity is aligned to the follower in real-time. A belt set to "follow me" mode transmits the perfect position, tolerance and feedback configuration to the Follow belt(s). The Follow belts compare this to the current position of any individuals associated with Follow belts and apply the appropriate feedback.

A "follow me" broadcast may be the method for third parties to integrate use of the belt with their workout videos. The video or program would include the Follow Me broadcast protocol. The third party could broadcast the current Follow Me position in real-time as part of the program. This method of delivery also includes aspects of Manual and Visual synchronization.

Soundtrack:
this method aligns activities on a timeline referencing an existing soundtrack. The belt may activate the proper activity based on the comprehension of the current moment in the soundtrack. This requires that a soundtrack dimension be included in the configuration of the assembly of a maneuver or a drill. The creation of the movement may require the system to capture the movements in real-time against the playing of the audio soundtrack. It could be one of the first steps in recording a maneuver—set the soundtrack then record activities on top of it. The system could also be used to synchronize the activities to video when creating a recorded Follow Me broadcast.

Visual feedback may take the form of indicators such as LEDs located on the outside of the belt. For example, the visual feedback for communicating whether or not the hips are level may be LEDs or other light emitting devices positioned on the right and left side of the belt and fully visible from a frontal, side and rear view. The visual indicators may be directly observable by the user, may be indirectly observable by the user, and/or may be observable by a coach or therapist. In a non-limiting example, the user may be in a dance studio with mirrors on the wall and therefore able to see the visual indicators on the belt or the user may notice that the visual indicators are illuminating nearby objects such as walls or furniture if they happen to be nearby. When the activity is performed in front of a coach or therapist the visual indicators may assist the coach/therapist in understanding what aspects of the activity are not being performed properly.

Visual indicators are not limited in the manner that they be used to communicate feedback to the user. In a non-limiting example, visual indicators may be used to provide feedback based upon their position on the belt, based upon changes in color or intensity, based upon the timing of their activation or temporal patterns of repeated activation, based upon sequential patterns of activation, or combinations of these. The visual indicators associated with the belt may be activated not only to indicated incorrect positioning and orientation of the body portion, such as the hips, of the user, but also may indicated when the position and orientation of the body portion of the user are in the ideal or perfect position and/or orientation.

Haptic feedback may take the form of a cell-phone vibration motor, a vibration from a timing device, or any other vibration source that is small enough, yet powerful enough, to be installed within a belt in such a manner that the user may feel the haptic action when the action occurs. This method of feedback is well suited for uses where the end user is not in the position to receive feedback visually. In a non-limiting example, if the end user is performing a movement where visual indicators are blocked by body parts, where visual indicators are blocked by the brightness of the environment or where the belt is worn under garments activation of the haptic feedback may provide the user with the immediate feedback that is not received from the visual feedback indication. In this non-limiting example, if the end user is using the belt during activities such as snowboarding, layering of garments may be detrimental to the use of visual feedback because the visual feedback indicators may be obscured by clothing worn by the user over the belt.

In addition, haptic feedback is not limited in the manner that it may be used to communicate feedback to the user. In another non-limiting example, haptic indicators may be used to provide feedback based upon their position on the belt, may provide feedback through changes in intensity of the vibration, through the timing of their activation or temporal patterns of repeated activation, or through sequential patterns of activation, or combinations of these feedback indications.

In an embodiment, the combination of visual and haptic feedback provides a greater possibility that the feedback signal is detected by the user, because audible feedback indications alone may be problematic in some noisy environments. However, the invention may include additional forms of feedback through other mechanisms that may be incorporated into the belt, such as audible feedback. Audible feedback could provide correction-specific feedback by using different positions on the belt for sound transducers and using different pitches and intensities of sound to signal different types of corrections. Audible feedback may be provided to the wearer of the belt through direction communication through a third party earpiece, such as earpieces associated with headphones, or communicated from a device such as a smartphone, tablet, computer, or other wearable device.

As a non-limiting example, a sound transducer could be positioned on the belt at the left side of the user and used to signal adjustments that need to be made on the user's left side and a sound transducer could be positioned on the belt at the right side of the user and used to signal adjustments that need to be made on the user's right side. In this example, a lower volume tone could indicate that a subtle correction is needed while an increasingly louder tone could indicate increasingly severe corrections. Additional audible feedback may take the form of soundbites, ringtones, pitches, intonation, text to speech, or any other audible broadcast that may be transmitted to the user. In some embodiments other feedback mechanisms such as thermal changes and mild electrical shocks may also be used.

In some embodiments the feedback mechanisms (for example, visual indicators and haptic motors) may be located at fixed positions on the belt. The feedback mechanisms may be associated with the belt in such a way that they may be relocated (within certain limitations) to alternate positions on the belt. This may also include pluggable replacement of entire sections of the belt. In a non-limiting example, a feedback module which partially encircles the belt and provides LED indicators for visual feedback may be disconnected, removed, and replaced with an alternative feedback module which also partially encircles the belt and provides haptic feedback.

Additionally, multiple forms of feedback may be associated with the same belt. In a non-limiting example, a belt configured to provide multiple feedback mechanisms at the same time could indicate certain corrections visually, certain corrections through haptic feedback, and certain corrections using one or more audible tones. The belt may be configured such that one or more feedback mechanisms are active at any given time, or, alternatively, different feedback signals may be utilized to indicate different states, such as an audible tone for a level indication in the transverse plane and a haptic feedback signal for orientation in the sagittal plane to permit the user to understand that two separate types of orientation adjustments must be made to reach a perfect orientation.

In an embodiment, the controller may allow for the definition of positions and motions that describe a portion of an activity. In some embodiments the belt may provide a simple 'learn and repeat' mode of operation where someone skilled in the performance of an activity dons the belt to create the learn portion of the mode of operation. The learn and repeat capability enables a performer to perform to capture the position or movement and then pass the position or movement to another user by physically sharing the belt or in some manner electronically passing the position or movement to the other user's belt. The skilled performer activates the 'learn mode' of the belt through an action such as touching a button on the belt or moving the belt in some predefined pattern, and then assumes a position or performs a motion. The belt may then record the sensor readings associated with the positioning assumed by the skilled performer as the skilled performer moves through one or more actions and/or positions. At the completion of the position or action activity, 'learn' mode is turned off by the skilled performer by pressing a same button on the belt or moving the belt in some predefined pattern.

In this embodiment, the belt may then be donned by a second individual, who is not at the same skill level as the skilled performer, and placed into 'repeat' mode through the selection of an activation element, such as, in a non-limiting example, a toggle switch. As the second individual assumes the same position or performs the same motion the belt analyzes the position or motion performed by the second individual and compares the performance of the second individual with the performance previously recorded from the skilled individual and recalled from digital storage to provide a basis for comparison. Based upon this comparison, the controller may provide feedback whenever significant differences between the performance recorded from the skilled performer and the performance of the second individual are noted.

In an alternative embodiment, a belt may be toggled into a "follow me" mode to permit real-time access to position information from a belt that is being worn by an instructor in any discipline. The goal of "follow me" mode is to enable an instructor to communicate acceptable positions or movements in real time without swapping belts with students as defined in Teach and Repeat mode. "Follow me" acts as a direct conduit transmitting the current positions of the instructor in real time to any connected belt that is operating in Follow mode.

When a belt is toggled to "follow me" mode it broadcasts an invitation to other belts within wireless communication range. Any belt that accepts the invitation automatically initiates Follow mode. The belt in "follow me" mode transmits its current position to all Follow mode belts. The Follow mode belts use the real-time position enacted by the instructor as the current acceptable position or movement. In non-limiting examples, the "follow me" mode may be of use in training users in ballet, yoga, rehabilitation, dance, as well as other movement and motion activities.

In a non-limiting example, an application program running on an external device such as a smart phone, tablet computer, or personal computer may allow the parameters of a perfect position or motion to be defined using graphical or textual inputs, saved as a configuration with an identifiable name selected by the application user in an electronic database, and ultimately transferred to the belt over a communication link.

Certain embodiments of the invention may include features allowing sequences of positions and motions to define static maneuvers. In a non-limiting example, the belt may provide a "learning mode" which identifies previously defined positions and motions as they are performed by a skilled individual and which then creates a configuration to record the sequence of motions and positions that were performed. In some embodiments, maneuvers may be defined using an application program running on an external device such as a smart phone, tablet computer, or personal computer. Such an application program may allow an individual to select previously defined positions and motions by name, define a sequence of such position and motions, and save it as a configuration under a meaningful name in a record maintained in an electronic database.

In some embodiments of the invention the controller may allow positions, motions, and maneuvers to define complicated sequences called drills. A drill may represent a run down a snowboarding slope from top to bottom, a complete performance of a ballet dance, a full gymnastic floor exercise, an entire physical therapy exercise, or any other complex series of movements required of a sport, artistic, or other activity. Similar to maneuvers, drills are configurations that save a sequence of previously defined positions and motions in one or more records maintained in an electronic database. The previously created drill configurations may be recalled from the electronic database and used to train additional users, or to refresh the skill of a previous user.

Maneuvers and drills aid in storage efficiency within the controller because whereas individual positions and motions may require storing a large number of parameters corresponding to positions in 3D space, velocities, orientation, timings, etc (for multiple sensors), a maneuver or drill configuration may be stored as a sequence of numbers where each number may represent an index to a previously defined position, motion, or maneuver. In some embodiments of the invention no distinction might be made between maneuvers and drills. In a non-limiting example, in some embodiments a maneuver may be allowed to include other maneuvers and a drill is thereby nothing more than an extensive maneuver composed of nested maneuvers.

As a non-limiting example, a snowboarder using an application program on an external device such as a smart phone, tablet, network computer, or personal computer may first define the proper parameters consistent with a position which involves placing the feet slightly farther than shoulder width apart and slightly splayed, knees slightly bent and over the feet, body erect, hands near the sides at waist level, and head turned towards the direction of travel. The snowboarder may save this position within an electronic database of drills and maneuvers as a configuration called the "duck stance". The snowboarder may also define the proper parameters consistent with a motion which involves shifting the center of gravity of the snowboarder perpendicular to the direction of travel in the direction that the snowboarder's chest is facing. This motion may be stored within the database as a configuration called "leaning in". The snowboarder may then define a maneuver starting with a duck stance, then leaning in, and resuming the duck stance. This series of configurations may be saved as a maneuver called a "cutback".

The snowboarder may continue to define other maneuvers involving traversal of straight sections of a downhill course, going around turning indicators called gates on one side or the other, and other maneuvers that are common to the skill and practice of snowboarding. The snowboarder may eventually define a drill called a "snowboard race" which is consistent with a snowboarder completing a specific downhill course while navigating straight sections, numerous gates, one or more cutbacks, and any other skilled maneuvers previously defined and stored in the drill and maneuver database.

The drills, maneuvers, and/or configurations defined by one or more users may be transferred to the belt and the belt may be worn while a user performs any of the recalled drills, maneuvers, or configurations retrieved from the drill and maneuver database and stored in active memory associated with the belt. In the non-limiting example of a user who is a snowboarder, the user may recall an entire snowboard course and traverse the maneuvers and configurations for the course described by a drill that is defined as a "snowboard race". When the parameters observed by the belt during the performance do not match the parameters described by the maneuvers and configurations pre-configured in the "snowboard race" drill, the belt may provide real-time feedback to the snowboarder as to the variance between the pre-configured parameters for the "snowboard race" drill and the active motions performed by the snowboard user.

As another non-limiting example, a ballet instructor using the application program may first define the proper parameters consistent with a position which involves placing the feet parallel to each other about 1 foot apart and pointing in opposite directions while the arms are held over the head. The instructor may save this position entitled the "fifth position". The instructor may also define the proper parameters consistent with a configuration which involves an upright dancer whirling 360° on the toes of one foot while the other foot is raised to touch the knee and with hands held in front of the dancer near the abdomen. The instructor may save this configuration called a "pirouette" in the drill and maneuver database.

The instructor may further define additional ballet positions and configurations and save, for each position and configuration independently, parameters consistent with the performance of that position or configuration. Each set of parameters describing a position and/or configuration may be given a recognizable name. The instructor may then define a maneuver by selecting positions and configurations by name (for example, "glissade", "jeté", "coupe", "step", "jeté", "pas de chat", etc) and save the sequence of these positions and configurations as a maneuver called "allegro" and save this maneuver into the drill and maneuver database.

The ballet instructor may further define a drill entitled the "Dance of the Sugar Plum Fairies from the Nutcracker Suite". The drill may be defined to include specific positions, configurations, and maneuvers consistent with the performance of that drill, which is consistent with a dance of the same name that is commonly practiced and presented by ballet performers. The positions, configurations, maneuvers, and drills defined may be retrieved from the drill and maneuver database and transferred to the belt. The belt may be worn while a ballet dancer practices the "Dance of the Sugar Plum Fairies." When the parameters observed by the belt during the performance do not match the parameters described by the retrieved drill, the belt may provide real-time feedback to the dancer in the form of audible, visual, and/or haptic signals.

Certain embodiments of the invention may allow the controller to not only define drills, maneuvers, configurations and positions, but to also copy, edit, delete, rename, and generally manage previously saved drills, maneuvers, configurations and positions. The belt may be operative to perform these functions or to communicate with an external device such as a smart phone, tablet computer, or personal computer to access these functions.

When a drill is selected for use, the controller expands the drill into a sequence of individual maneuvers, configurations and positions. Each maneuver in that expansion is, in turn, expanded into a sequence of individual configurations and positions. Each configuration and/or position encountered at any point in the expansion is, in turn, expanded into a sequence of parameters that describe the proper performance of that configuration or position at every point in time. Thus, a drill is eventually expanded into a long sequence of parameters that represent what the performer should be doing at every moment during the performance of the drill. This complete expansion of parameters is compared to user movements in real-time during the actual performance and any significant deviations may trigger one or more feedback mechanisms in the form of audible, visual, and/or haptic signals.

Some embodiments of the invention may allow the controller to support tolerances. Tolerances are attributes of a configuration or position which defines how much deviation from a perfect performance is allowable. Tolerances may optionally apply to any measured or tracked parameter including, but not limited to position in 3D space, orientation, speed, direction, angle of attack, timing, or any other parameter important to the proper performance of a drill, maneuver, configuration, or position. In some embodiments the controller may provide default values for tolerances on one or more parameters. In some embodiments, the controller may allow for individual or groups of tolerances to be changed from a default value to a customized value. In a non-limiting example, a snowboarder may define a "forward lean" position such that the degree of the lean can be changed to a value that is much more consistent with the snowboarder's personal preferences or skill level.

Users may utilize defined static maneuvers and drills to learn physical motions from an instructor. Alternatively, users may initiate "follow me" mode to learn the motions of physical activity as an instructor is performing the actions. In a non-limiting example of users operating in "follow me" mode, an instructor may don a belt, align the sensor and sets the belt to "follow me" mode. An invitation may be sent to nearby belts donned by students. The students accept the invitation from the appropriate "follow me" belt and engage Follow mode.

In this mode, instructors may control overall configuration and total delivery of feedback to all belts participating in Follow mode. In a non-limiting example an instructor may mute any feedback transmitted to any connected Follow belt until the class begins. The instructor may set a class tolerance depending on the skill level. Students may also configure aspects of their belt such as muting or unmuting feedback or adjusting their individual belt tolerance while linked to the "follow me" belt.

The instructor unmutes the feedback, begins instruction and performs a series of positions and movements. The "follow me" belt donned by the instructor in real-time defines and communicates the perfect position to all connected belts in Follow mode.

Students in Follow mode, mirror the instructors exact (current) movements in real-time. The instructor may hold a position, perform a movement, mute all Follow belt's feedback while demonstrating a movement, then unmute for the class to continue Follow. When any student's current position is unacceptable they receive feedback per the class "follow me" configuration.

While performing in "follow me" mode the instructor may capture a performed position as the perfect position and freeze it as the current perfect position. This shifts the perfect position for the Follow belts to the frozen position and not the instructor's current position. Follow belts must now perform that single position as demonstrated and captured by the instructor enabling the instructor to move freely through the class providing students hands-on corrections. When finished, the instructor may reengage real-time tracking.

Similarly during the class the instructor may capture a movement by designating the start and finish of the movement while performing. The instructor may then freeze this movement as the current perfect movement on a loop or initiated on demand.

Certain embodiments of the invention may provide controller features that allow one or more tolerances within a previously defined configuration to be changed each time that configuration is used. In a non-limiting example, a physical therapist may define positions, configurations, and maneuvers consistent with various stances and exercises that promote good posture, improve flexibility, aid in the recovery from injuries, and provide other benefits for the user. The parameters for the positions, configurations, and maneuvers may include tolerances that change often based largely upon the specific injury or condition of a patient and how much progress they have made in previous therapy sessions.

By way of example and not of limitation, the therapist may define a maneuver for a stretching exercise called a "lunge" as a type of stretch where the user starts with their upper body straight and steps forward with one leg, lowering the hips until both knees are bent at almost 90°. A certain amount and type of hip motion is expected during a properly performed lunge. The belt can measure the hip motion in reference to a stationary point relative to the user and indicate if it is performed correctly or not. In an alternative embodiment, the therapist may want to have the belt measure a '50% lunge', where the tolerance of the maneuver should be adjusted to expect only 50% of the normal motion. As the individual's ability to perform lunges improves, the therapist may want to advance to 60% lunges, 70% lunges, and additional levels of capability—gradually working up to a full and proper lunge. The controller may provide features that allow the therapist to invoke the "lunge" maneuver and at the last moment specify a parameter of 50% which the controller application may use to adjust the tolerances within that maneuver to achieve the level desired for the user by the therapist.

Tolerances can be specified in any units consistent with the parameter to which the tolerance is to be measured. In a non-limiting example, tolerances may be applied to specific distance, angle, speed, time, percentage, and any other parameter that may be measured. Tolerances can be an effective way to deal with resting pauses that an individual might insert into a performance—the drill describing their performance can simply include resting stances with a wide range of values for duration.

In some embodiments, tolerances may be a single value which may be treated as an absolute value (for example, a tolerance of 5% may mean that anything outside of +/−5% from the perfect parameter is not allowable.) In some embodiments, a single value tolerance may apply only to deviations on one side or the other of a perfect performance (for example, a lean must not exceed 45° by more than 5° but may be short of 45° by any amount). In some embodiments, multiple values may be specified independently of each other to define an allowable range for a parameter (for example, a lean of 45°, +5°/−15°). The invention may provide for the use of single value and multiple value tolerances within the same embodiment.

In some embodiments, multiple tolerances may be applied to a single position or motion. In a non-limiting example, in the lunge motion previously described, tolerances may be applied to the timing of the lunge, the ending angle, maintaining a level side-to-side hip position, and additional positions or motions that are important or desired indicators of proper performance for a position or motion.

In some embodiments, a tolerance may be defined for a parameter other than those related to a perfect performance. This level of tolerance may allow for feedback mechanisms to be triggered to indicate specific types of deviations. In a non-limiting example, if a perfect performance is a 45° lean, then the user may wish to define a perfect performance to be 45°+/−5° and also define two additional tolerances values: a tolerance value for a lean that is too deep, which may be defined to be 55°+/−5°, and a tolerance value for a lean that is too shallow, which may be defined to be 35°+/−5°. Having done so, the user utilize these tolerance values to trigger different, specific feedback mechanisms, or no feedback, to be invoked in the case of a perfect lean, a lean that is too shallow, and a lean that is too deep.

In some embodiments, the controller may allow tolerances to be named. In a non-limiting example, the name "Nominal" may be given to the range of tolerance value(s) that represents a perfect performance of a position or motion while the names "Too Deep" and "Too Shallow" may be given to the other sets of tolerance values as described above.

In some embodiments of the invention, the feedback that is provided by the belt may be predefined by the programming within the controller of the belt. The belt may come preprogrammed with tolerances and feedback definitions that apply automatically to "learned" behavior. So if a therapist dons the belt, activates "learn" mode, walks across the room, then activates "repeat mode" while a client wears the belt, the belt may have preprogrammed response to, as an example, illuminate visual indicator on the left side of the client leans too far to the left while performing the same walk. In some embodiments, these default tolerances and feedback definitions may be overridden using over mechanisms, such as an application program running on an external device.

In an initial configuration, the level belt may be programmed to provide feedback on a small set of standard maneuvers. Standard maneuvers may include: standing, posture, squat, forward lunge, side lunge and core rotation. Each standard maneuver may include a pre-configured setting programmed into the belt to ensure optimal feedback accuracy and may include a set of adjustments based on real-time feedback or patterns of real-time feedback. The goal of pre-configuring one or more standard maneuvers into the belt is to facilitate improvements maintaining square hips, neutral spine and efficient movement.

Some embodiments may permit feedback to be defined by a user. In these cases the user may create a feedback configuration identifying the specific feedback mechanism that should be used to communicate position and motion differences from defined maneuvers. As with other user-defined configurations, feedback configurations may be given a meaningful name, stored, edited, deleted, copied, transferred between the belt and an application program that runs on an external device such as a smart phone, tablet computer, or personal computer, and so on. Feedback configurations are not precluded from defining one or more attributes that modify how the feedback mechanism is presented. For example, a feedback configuration called "Too Far" might define that an amber LED indicator on the front of the belt is to be illuminated for 300 msec at 50% intensity. Another feedback configuration called "Way Too Far" might define that a red LED indicator on the front of the belt is to be illuminated for 600 msec at 75% intensity.

The invention does not preclude feedback configurations from describing multiple feedback mechanisms that are to be used simultaneously or sequentially. As a non-limiting example, the user may define a feedback configuration called "Shift Weight To The Left" and might specify that a left side haptic motor is to be activated for 500 mmsec and that an amber LED on the left side is to be simultaneously turned on for a duration of 300 msec. Feedback configurations may invoke a sequence of mechanisms such as a light pattern produced on the belt using a sequence of LEDs.

In an embodiment, feedback configurations may be nested or recursive. In a non-limiting example, a feedback configuration called "Rebalance Weight" might be defined to invoke both the previously defined "Shift Weight Left" and "Shift Weight Right" feedback configurations simultaneously when it is invoked. In this embodiment feedback mechanisms may be invoked for perfect performances, or within tolerance performances. A feedback indication may take the form of a positive feedback indication, whether visual, aural or haptic, for performing a maneuver correctly.

This document has presented a specific view of position, motion, maneuver, drill, tolerance, and feedback configurations based upon a preferred embodiment. A reorganization of configuration information does not depart from the scope and spirit of the invention described herein.

In some embodiments the controller may allow for multiple outcomes of a maneuver. The controller may allow tolerances to be applied to those multiple outcomes. This may be useful in cases where the belt will be used to teach dancers a specific dance move that involves other dancers. In a non-limiting example, in pre-configured maneuvers where the dancers are to form a line each dancer may have to move by a different distance to form the line correctly. The perfect distance may vary based upon whether the dancer is 1st in line, 2nd in line, and continue for each dancer position in the line. By allowing for the possibility of multiple outcomes the belt is able to determine that a dancer has correctly moved to a position relative to other dancers as designated for each particular dancer. In a non-limiting example, the configuration for a particular maneuver might indicate that a dancer should move in a straight line by a distance of any of 10 feet, 20 feet, or 30 feet with a tolerance of +/−2 ft. If a dancer moves 19.5 feet the belt is able to determine that they have executed the maneuver correctly. However, a dancer who moves 27 feet and stops might receive feedback from the belt that they did not move far enough while a dancer who moved 13 feet and stops might receive feedback that they moved too far.

In some embodiments the controller may be capable of detecting the transition between individual positions and motions. The controller may do this, for example, by noting that a change in position, speed, direction, orientation, or other parameters is no longer consistent with the current position or motion but is consistent with the next expected position or motion. This ability to sense transitions is essential to one or more pre-set capabilities of the belt. In a non-limiting example, the ability to recognize multiple outcomes to a maneuver as described above may rely on the fact that the controller has been configured for a straight line motion, and may use the dancer's positions and maneuvers to determine that a straight line motion is continuing even though the dancer is at a first possible outcome location.

In some embodiments the controller may allow for the performer to make a real-time choice regarding the next maneuver during the performance and still provide meaningful feedback regarding the execution of the performance. In a non-limiting example, a drill configuration for a gymnastic floor exercise may describe that the next maneuver after a "10 Foot Fast Run" should be either a "Cartwheel" or a "Forward Flip". The controller may determine that the transition at the end of the "10 Foot Fast Run" has been reached when the actual motion deviates substantially from than expected during a fast run. The controller may begin to compare the actual performance with both maneuver configurations looking for motions consistent with either a "Cartwheel" or a "Forward Flip". If the actual performance begins to match the motion described for a "Forward Flip" maneuver and does not match the motion described for a "Cartwheel" maneuver then the controller may determine that the next maneuver selected after the "10 Foot Fast Run" is a "Forward Flip" and not a "Cartwheel". All during the drill, the belt is able to compare the actual performance with a perfect performance of a "10 Foot Fast Run" followed by a "Forward Flip" and provide meaningful feedback regarding observed deviations from both of those maneuvers, but still allow the performer to make real-time choices regarding the specific maneuvers that will be used during the performance.

Where particular aspects and features of the controller have been described it should be recognized that some aspects and features may be configured in different ways. Some aspects of the controller such as real-time comparisons of performance parameters against perfect parameters must be incorporated into the belt itself so that the belt can detect deviations, apply appropriate tolerances, and activate feedback mechanisms. Other aspects of the controller such defining and editing maneuvers may be incorporated in some form within the belt or may be provided by an application program that runs on an external device such as a smart phone, tablet computer, personal computer, wearable armband device, or any other device having a network communication capability.

It should be noted that the invention may provide for exporting configurations, such as in one or more non-limiting examples, describing positions, motions, maneuvers, drills, feedback, and other aspects of the invention. These configurations may be transmitted over a communication link from the belt to an external device such as a smart phone, tablet computer, personal computer, wearable armband device, or any other device having a network communication capability. The exported configurations may then be stored in one or more electronic databases and exchanged between two or more users of the system.

Some embodiments may provide application programs, user interfaces, application programming interfaces (APIs), or similar resources to enable a community of belt enthusiasts to create their own positions, motions, maneuvers, drills, feedback, and application programs to be used with the belt and the associated second sensor instrument. Newly created content may permit the use of the belt and second sensor instrument system to be used to analyze new activities, create new feedback mechanisms, devise new methods of gathering or analyzing metrics regarding an individual's performance while wearing the belt, and provide the benefits of the system to additional classes of users in the newly designated activities. The belt sensor and secondary sensor system may be integrated into third party movement programs through written, audio, or video instruction by a third-party, describing how to adjust movement based on real time belt feedback. Third parties might also incorporate the belt into their movement programs by devising and configuring within the belt sensor and secondary sensor system new positions, motions, maneuvers, drills, tolerances, feedback definitions, and other performance parameters. Curated libraries of such content may be created and stored within electronic databases for later retrieval and use. In a non-limiting example, a curated library may consist of a website repository of position, motions, maneuvers, drills, feedback, etc related to specific activities.

In an embodiment, applications may be developed for the belt sensor and secondary sensor system that allow the belt to compute and report a 'score' at the end of a performance. In a non-limiting example, the belt could do this by having 'points' metadata associated with each maneuver and with each tolerance or feedback definition. The controller could then start a drill with a score of zero and add to the score at the successful completion of each maneuver. The controller could deduct points each time a feedback definition was invoked whether feedback was actually provided to a user or not. In this non-limiting example, it is possible that the entire feedback definition for a competition might be to deduct points from a starting maximum point value. At the end of the run the score could be reported by the belt or read using an external device.

In some embodiments the invention allows for communication between the belt and an external device such as a smart phone, computer tablet, personal computer, wearable armband device, or any other device having a network communication capability. This communication may take place over any of a number of different networks depending upon the embodiment. In a non-limiting example, this communication between the belt and an external device may be over a WiFi communication capability, while in another embodiment the communication may take place using a Bluetooth link. In each instance, software provided for an external device may allow a coach, instructor, therapist or other knowledgeable individual to create reusable configurations that describe basic positions and motions, sequences of basic motions referred to here as maneuvers, and complex sequences of maneuvers referred to here as drills which may then be transferred to the belt for use.

In some embodiments, the belt sensor and secondary sensor system may record a log of deviations and feedback that was provided to the user during a position, motion, maneuver, or drill. This log may be transferred from the belt to an external device such as a smart phone, tablet computer, personal computer, wearable armband device, or any other device having a network communication capability, and be presented to the user via an application program running on the external device. The presentation of this information may provide the user with a succinct assessment of how the performance was executed using terminology defined by the user in the naming of positions, motions, maneuvers, tolerances, and feedback configurations. In a non-limiting example of this embodiment, the presentation may clearly show that at time index 3:45 during the performance of the 2nd "Cartwheel" the user leaned "Too Far Back" and at time index 5:15 at the end of the "Forward Flip" the user "Landed Too Hard".

Situations may occur where individuals wearing the belt require feedback on hip or body position or orientation relative to a conveyance that is attached to the body, upon which the user is standing, upon which the user is being conveyed in some manner, or with which the user is associated in terms of a physical relationship to the conveyance. The conveyance may be stationary or in motion, including the possibilty that the conveyance is on or moving with respect to an inclined surface. When the conveyance is in motion the incline of the object may vary based on the terrain over which the conveyance may be moving. Non-limiting examples of these types of activities may include snowboarding, skiing and biking, as well as other activities performed outdoors.

In these situations a remote secondary sensor may be attached to the conveyance and communicatively linked to the primary belt controller. The remote secondary sensor may provide orientation data to the belt controller thus enabling calculation of hip 'level', as defined by a pre-configured status for 'level', relative to the conveyance. In some embodiments the remote secondary sensor may be a 3-axis accelerometer or other positional sensor apparatus. The belt may provide real-time feedback to the individual associated with the belt and belt sensors as to the current hip position in relationship to the conveyance. If the hips are not in the proper position then real time feedback is provided as if the individual were on a level surface. In a non-limiting example, when snowboarding the correct posture for a user standing upon a snowboard is pre-defined as hips parallel, centered, and level with respect to the board. When a user executes tricks in a snowboard park over tables, bars and inclined bars, the user's hips continue to be level to the board in order to properly execute the trick. Real-time feedback from the belt provides instant understanding of weight distribution issues that can be considered and corrected at the next course feature on the same snowboarding run. Real-time feedback at the moment of executing the trick provides the ability to draw instant conclusions, correct body posture in the moment or bail from the trick. This concept also applies to snowboarding actions such as riding trails, jumping and buttering. Parameters that permit a user to determine and maintain a level posture with respect to a conveyance may apply to any sport that requires movement on an object across a varying incline.

In an embodiment, the combination of two linked sensor apparatuses, such as, in a non-limiting configuration, sensors such as accelerometers located in the belt and on a conveyance, on moving objects also provides the system with the ability to provide real-time feedback to the end user regarding the position of the conveyance. An important aspect of executing tricks during snowboarding is to keep a board flat from side rail to side rail. Without video or feedback from observers the snowboard rider is unable to visualize if the board was flat or inclined to the heel edge or toe edge. Feedback indications from the belt may enable the rider to flatten the board in real-time or to correct the execution of the trick on the next course feature on the same snowboard run.

In an alternative embodiment, the system may provide for a first sensor apparatus that is not associated with a belt or other wearable element that is in communication with one or more secondary sensor apparatus elements that are associated with belts or other wearable elements associated with one or more users. The first sensor apparatus in communication with a second sensor apparatus that is associated with a wearable element, such as a belt, may be used to determine rotation of the second sensor apparatus. For a user wearing a second sensor apparatus incorporated within a belt, rotation is the measurement of the rotation of the hips of the user relative to that surface the user is standing on. In other words, the placement of the sensor defines the front, left, right and back of the space. The system may not be able to provide rotational/facing the right direction feedback without communicating position information with the first sensor apparatus that has been positioned on a surface.

In a non-limiting example, in a ballet class the instructor places the first sensor apparatus on the floor of a practice space to define the front, back, left and right positions within the practice space. This positioning of the first sensor apparatus enables the student's movements to be measured relative to the front of the room or eventually the front of a stage. In an additional non-limiting example, in a yoga class or following a video broadcasting pre-recorded or live streamed motions and drills, the first sensor apparatus may be set on a floor aligned with the position of a yoga mat associated with a user that is wearing a second sensor apparatus. The first sensor apparatus is in communication with each second sensor apparatus, permitting each user to receive position feedback information from the first sensor apparatus. This positioning enables the students associated with each wearable second sensor apparatus to perform movements in relationship to the front, back, left and right of the mat. This communication between the first sensor apparatus and the second sensor apparatus associated with each student enables each student to be evaluated in relationship to their mat. Enabling students to arrange their performance area as defined by the mat associated with each of the students in any arrangement as the space requires. Each student receives positional and rotational feedback from the first sensor apparatus that is independent of the feedback transmitted to any other user.

In an additional non-limiting embodiment, a gymnast may align a first sensor apparatus to the balance beam indicating all four directions of the surface plane of the balance beam. Once this alignment is complete and the position of the first sensor apparatus calculated with respect to a second sensor apparatus enclosed within a wearable item, such as a belt, associated with a user, the belt can provide rotational placement in space to the balance beam. The system may also provide positional information regarding hip and lean placement for each student, allowing the student to understand if they are facing the correct way or over-rotated when performing motions. Additionally, the first sensor apparatus may be enabled to determine space direction and rotation with respect to each student of a group of students all of whom are wearing a second sensor apparatus enclosed within a wearable item. In this non-limiting example, a group of students may all be aligned to the positioning of a first sensor apparatus permitting the entire group to share the common orientation of the first sensor apparatus as to direction and position, including rotation and lean, as defined by the position of the first sensor apparatus.

In this embodiment, an instructor could physically or programmatically switch the direction of the first sensor apparatus depending if the instruction is done facing the class or opposite the class. When facing the class the instructor can position the front direction of the first sensor apparatus towards the class. Students with their sensor(s) facing the instructor understand all feedback per the appropriate direction as a mirrored position. If the instructor wishes to perform a movement facing the same direction as the class the instructor may rotate the direction of the first sensor apparatus and all new positional data remains relative to the user as updated direction information is transmitted to each second sensor apparatus associated with each student.

Turning now to FIG. 1, this figure is a view showing some spatial relationships between a user 105 wearing an intelligent belt 110, a secondary sensor 115, and anatomical planes 120, 125, 130 consistent with certain embodiments of the present invention. In an exemplary embodiment, the user 105 wears the intelligent belt 110 over the illium. A positional sensor such as, but not limited to, a 3-axis accelerometer (not shown in this figure) on the intelligent belt 110 over the user's spine senses orientation and motion within the sagittal plane 120, transverse plane 125, and frontal plane 130. The sagittal plane 120 divides the body into left and right. The frontal plane 130 divides the body into front and back (or posterior and anterior). The transverse plane 125 divides the body into superior and inferior portions. The intelligent belt 110 is in wireless communication with the secondary sensor 115, which may be placed upon or associated with a conveyance so as to provide positional relationship information between the intelligent belt 110 and the secondary sensor 115.

Figure 2:
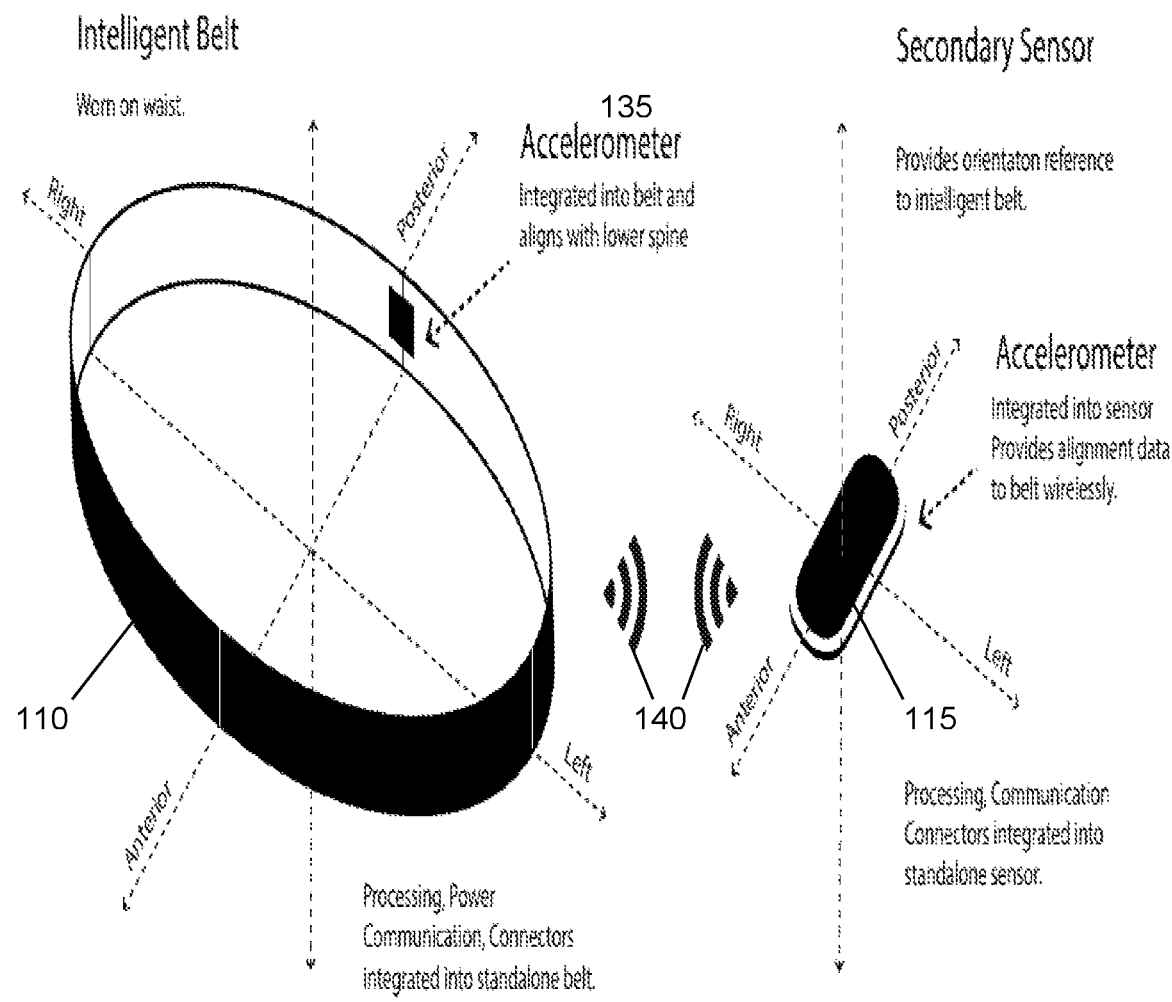
FIG. 2 is a more detailed view of an intelligent belt and a secondary sensor consistent with certain embodiments of the present invention.

Turning now to FIG. 2, this figure is a more detailed view of an intelligent belt 110 and a secondary sensor 115 consistent with certain embodiments of the present invention. In an exemplary embodiment, the position sensor 135 readings of the intelligent belt 110 allow the orientation of the hips in the three anatomical planes to be tracked. The intelligent belt 110 may or may not be configured to communicate with a secondary sensor 115, based upon the configuration of the drill, position, or maneuver to be performed by the user. On a level surface, or in the absence of a secondary sensor 115, the tracking done using only the position sensor 135 on the intelligent belt 110 is deemed to be accurate. In the presence of a secondary sensor 115 and an inclined surface the intelligent belt 110 sensor readings are corrected using secondary sensor 115 readings to account for the effect of the inclined surface, or the effect of a surface having one or more variations from a level orientation. Communication between the secondary sensor 115 and the intelligent belt 110 utilize a wireless media such as Bluetooth.

Figure 3A:
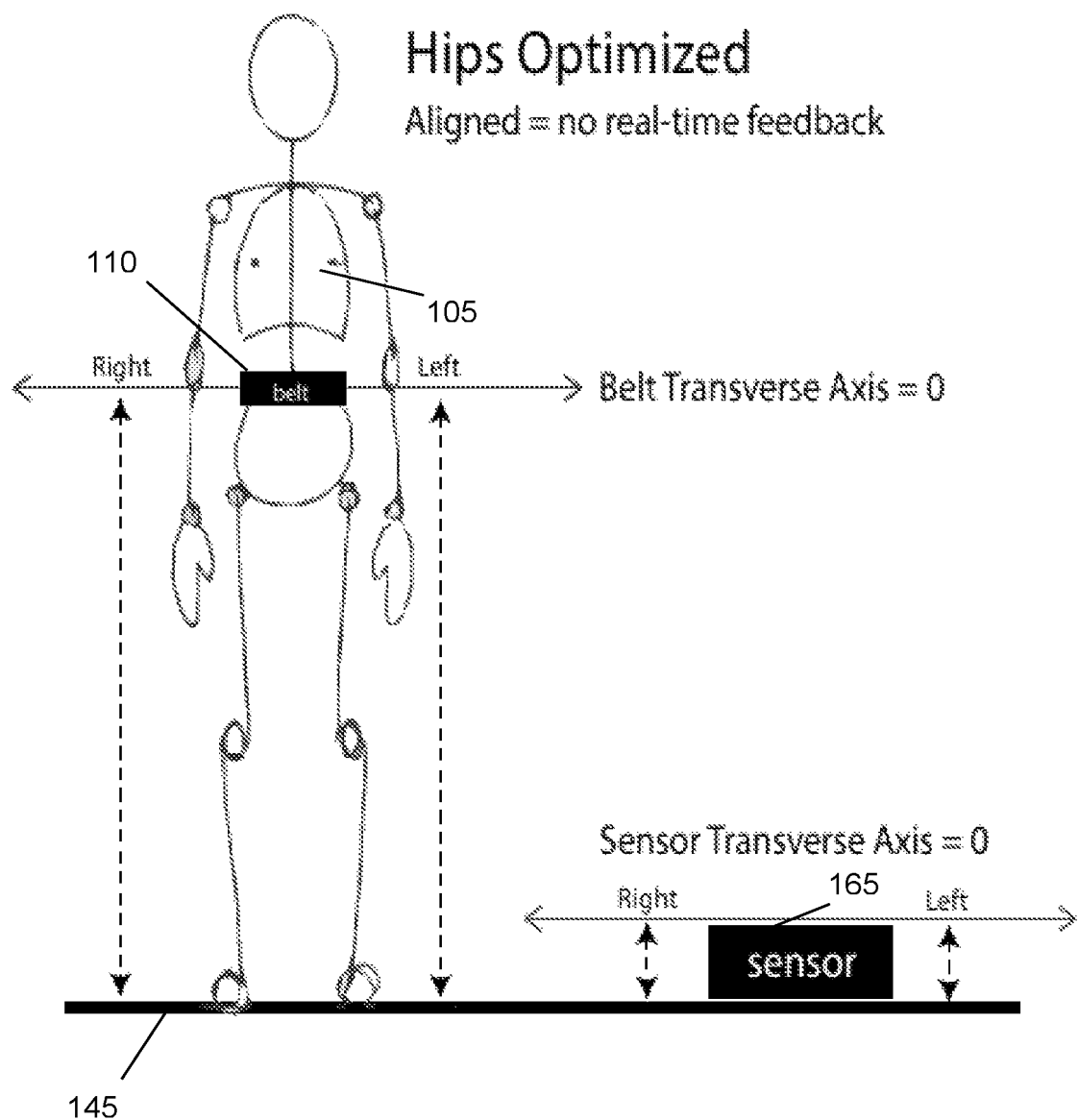
FIG. 3A shows an example of correct and incorrect hip placement and belt responses consistent with certain embodiments of the present invention.

Turning now to FIG. 3A, this figure shows an example of correct and incorrect hip placement and belt responses consistent with certain embodiments of the present invention. A user 105 is wearing an intelligent belt 110 and standing on a level surface 145 with their hips level. With either no secondary sensor 165 available, or with the secondary sensor 165 available and reading level, no correction for an inclined or variable surface is applied to the intelligent belt 110 position sensor readings. The intelligent belt 110 will therefore conclude that the hips are level and that no feedback mechanism needs to be activated.

Figure 3B:
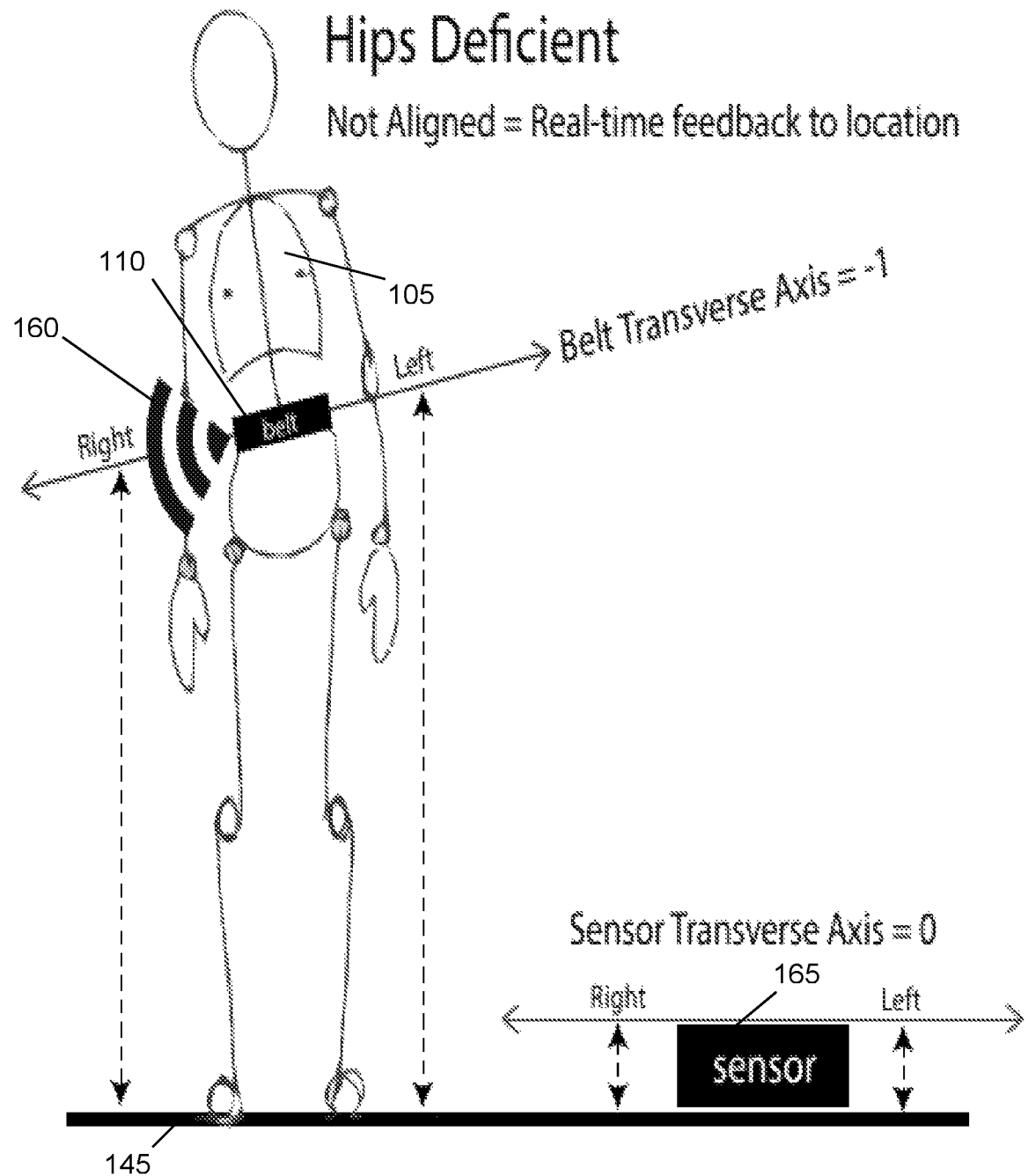
FIG. 3B shows an example of incorrect hip placement with hips not level and belt responses consistent with certain embodiments of the present invention.

Turning now to FIG. 3B, the same user 105 is wearing an intelligent belt 110 and standing on a level surface 145 but has now tilted and their hips are no longer level. With either no secondary sensor 165 available, or with the secondary sensor 165 available and reading level, no correction for an inclined surface is applied to the intelligent belt 110 position sensor readings. The intelligent belt 110 will therefore conclude that the hips are not level and, knowing the direction of the tilt, will activate a feedback indication 160 on the low side of the tilt.

Figure 3C:
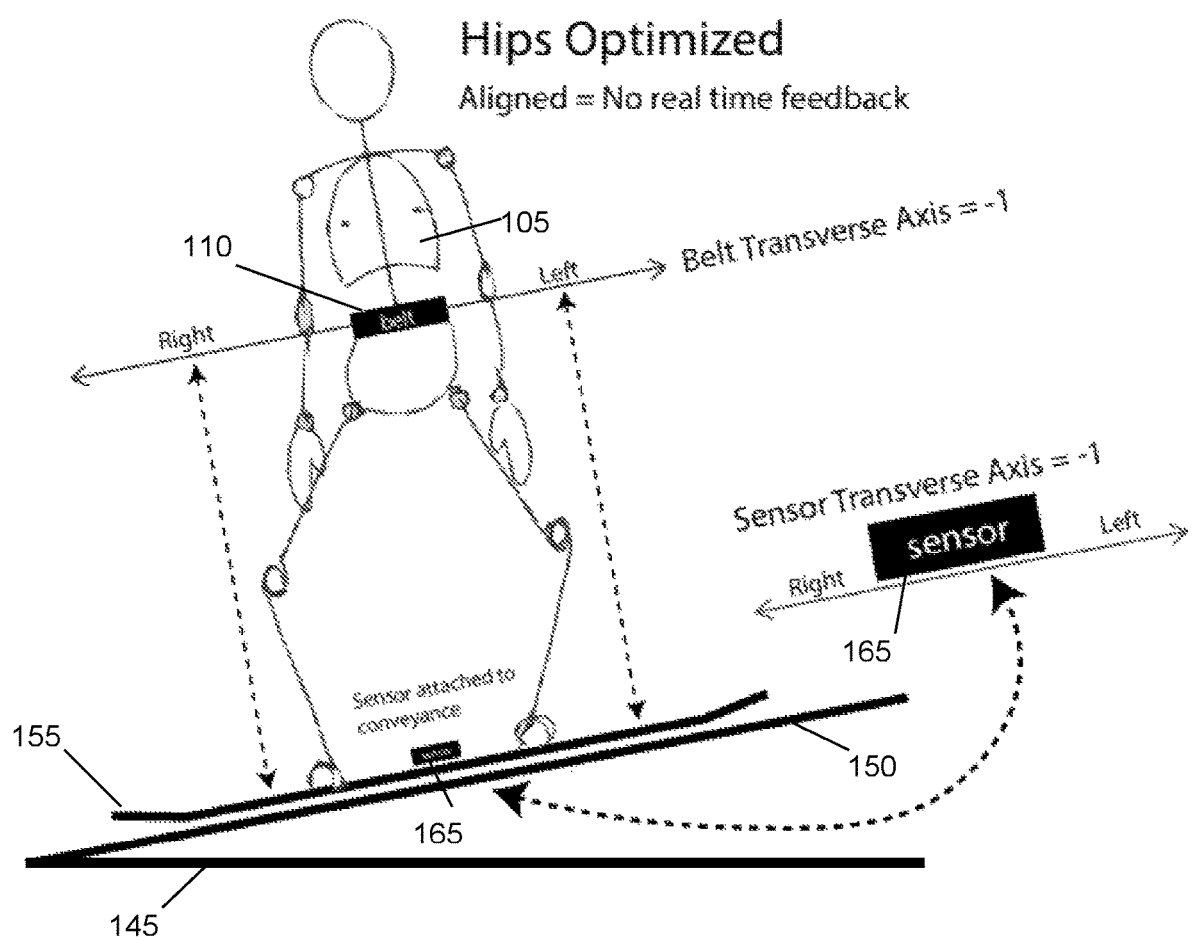
FIG. 3C shows an example of a wearer with the belt on an inclined surface consistent with certain embodiments of the present invention.

Turning now to FIG. 3C, a user 105 is wearing an intelligent belt 110 and standing on a snowboard 155 that is on an inclined surface 150. The secondary sensor 165 attached to the snowboard 155 communicates a new frame of reference to the intelligent belt 110 and a correction for the inclined surface is applied to the intelligent belt 110 position sensor readings. In this case, even though the raw position sensor readings from the intelligent belt 10 indicate a tilt, the correction for the inclined surface 150 allows the intelligent belt 110 to determine that the hips are in fact level with respect to the inclined surface 150 and therefore no feedback mechanism needs to be activated.

Figure 3D:
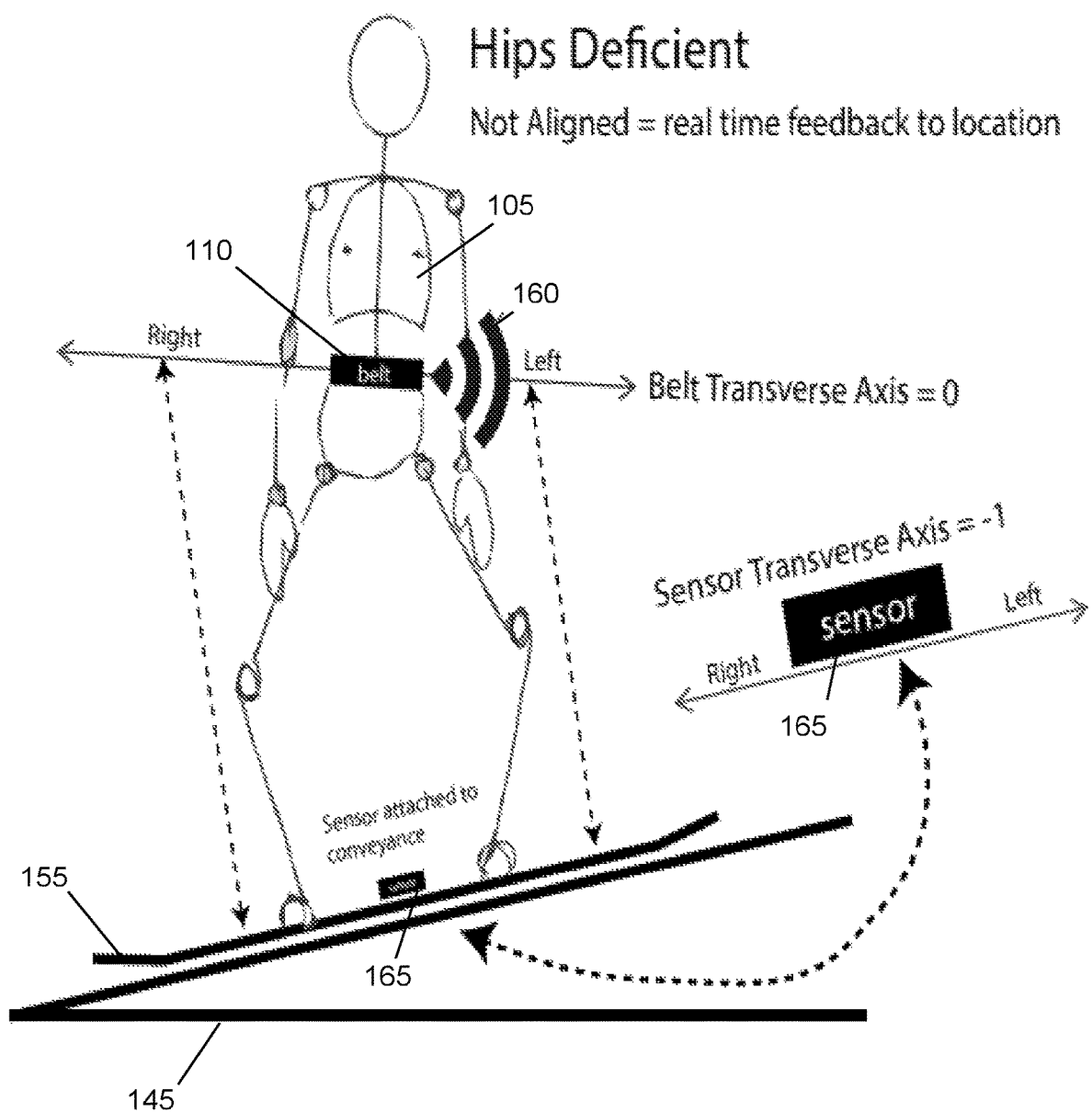
FIG. 3D shows an example of correct hip placement wearing a belt while standing on a snowboard on an inclined surface consistent with certain embodiments of the present invention.

Turning now to FIG. 3D, the same user 105 is wearing an intelligent belt 110 and standing on a snowboard 155 that is on an inclined surface 150. In this case, the user 110 is tilting in an uphill direction. The secondary sensor 165 attached to the snowboard 155 communicates a new frame of reference to the intelligent belt 110 and a correction for the inclined surface is applied to the intelligent belt 110 position sensor readings. Even though the raw position sensor readings from the intelligent belt 110 indicate that the hips are level, the correction for the inclined surface 150 allows the intelligent belt 110 to determine that the hips are in fact tilted with respect to the inclined surface 150 and, knowing the direction of the tilt, the intelligent belt 110 will activate a feedback indication 160 on the low side of the tilt.

Figure 3E:
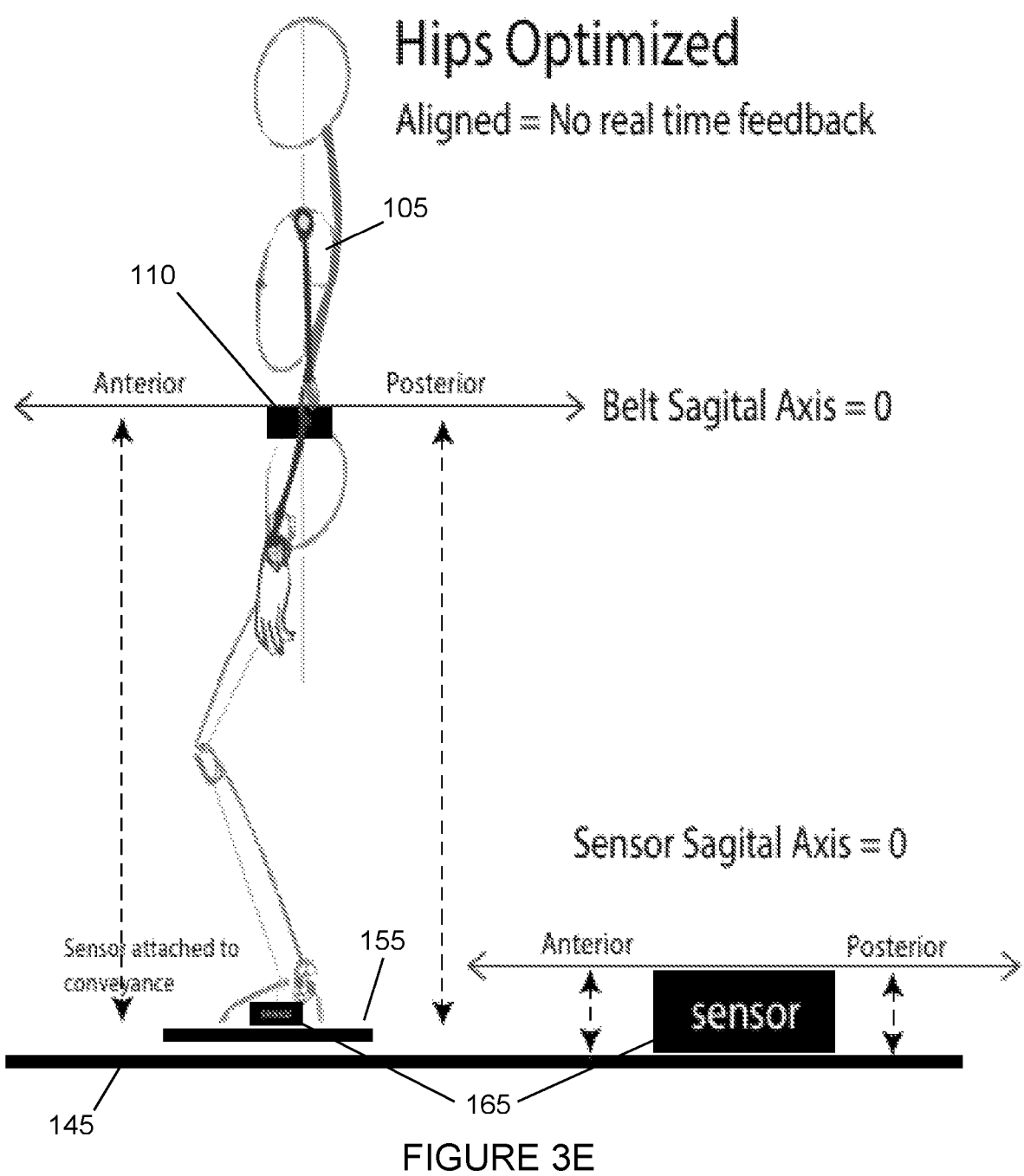
FIG. 3E shows an example of correct hip placement wearing a belt while standing on a snowboard on a level surface consistent with certain embodiments of the present invention.

Turning now to FIG. 3E, a user 105 is wearing an intelligent belt 110 and standing on a snowboard 155 that is on a level surface 145. The secondary sensor 165 attached to the snowboard 155 communicates a new frame of reference to the intelligent belt 110. Because the snowboard 155 is level the new frame of reference essentially has no effect on the intelligent belt 110 frame of reference. The intelligent belt 110 will conclude that the hips are level and therefore no feedback mechanism needs to be activated.

Figure 3F:
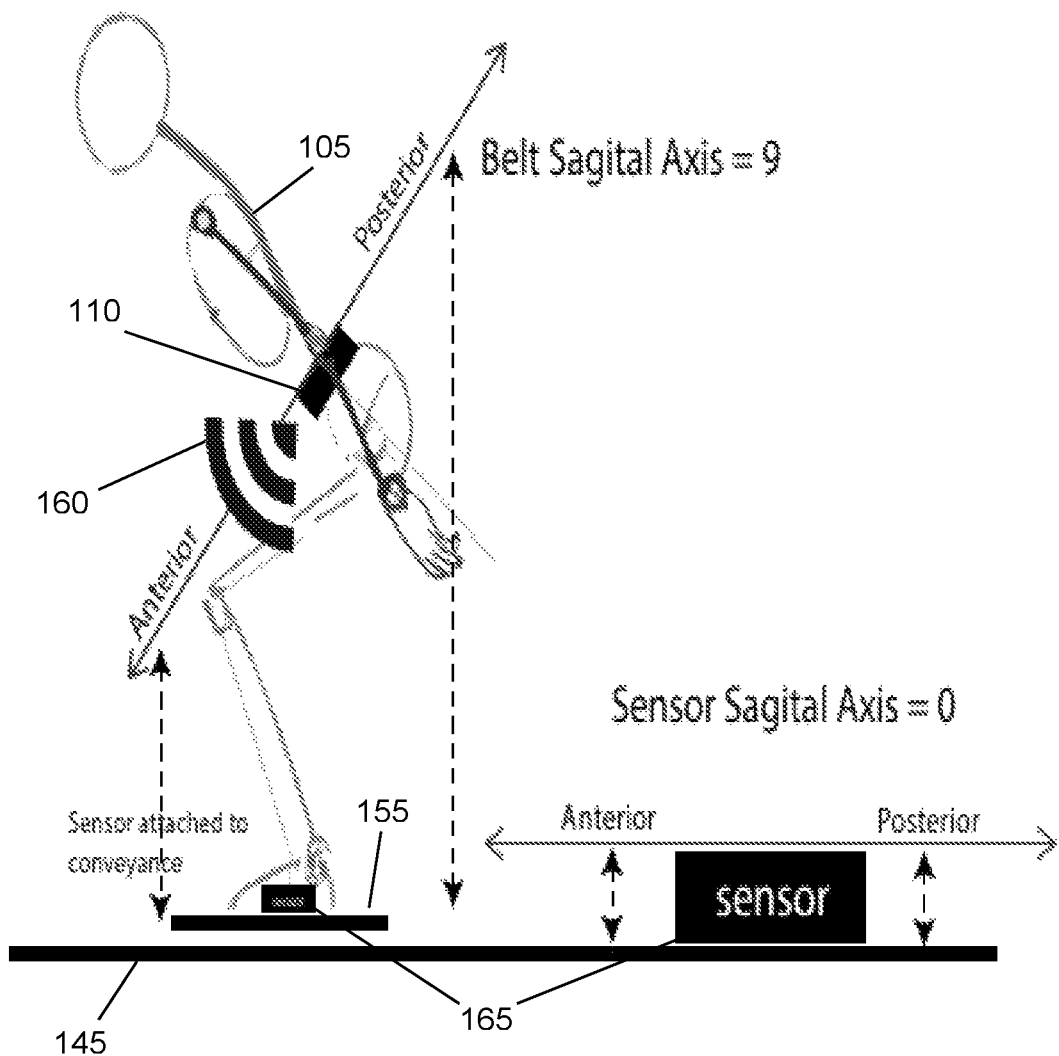
FIG. 3F shows an example of correct hip placement wearing a belt while standing on a snowboard on a level surface in communication with a second sensor consistent with certain embodiments of the present invention.

Turning now to FIG. 3F, the same user 105 is wearing an intelligent belt 110 and standing on a snowboard 155 that is on a level surface 145. The secondary sensor 165 attached to the snowboard 155 communicates a new frame of reference to the intelligent belt 110. Because the snowboard 155 is level the new frame of reference essentially has no effect on the intelligent belt 110 frame of reference. The intelligent belt 110 will conclude that the hips are not level and therefore will activate a feedback indication 160 on the low side of the lean.

Figure 4A:
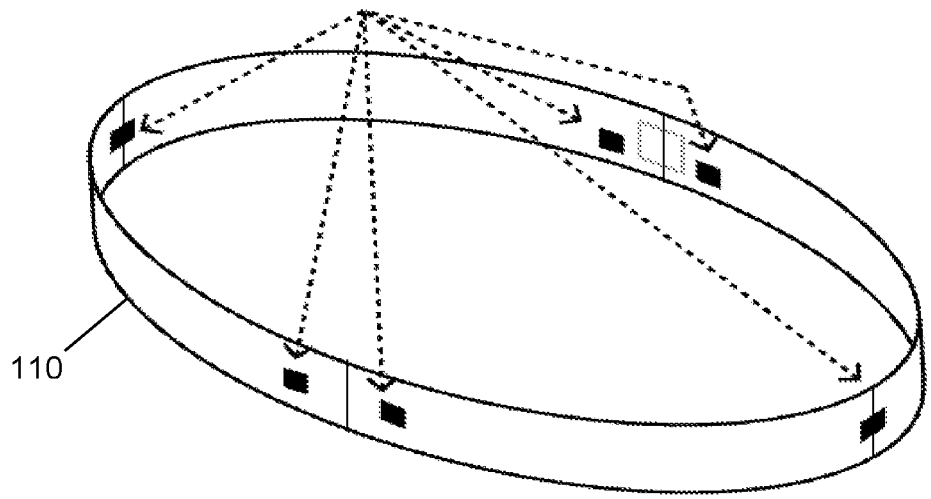
FIG. 4A illustrates that feedback mechanisms based upon visual, haptic, auditory, thermal, and other forms of stimulation can be located at various locations on the intelligent belt consistent with certain embodiments of the present invention.

Turning now to FIG. 4A illustrates that feedback mechanisms 200 based upon visual, haptic, auditory, thermal, and other forms of stimulation can be located at various locations on the intelligent belt 110.

Figure 4B:
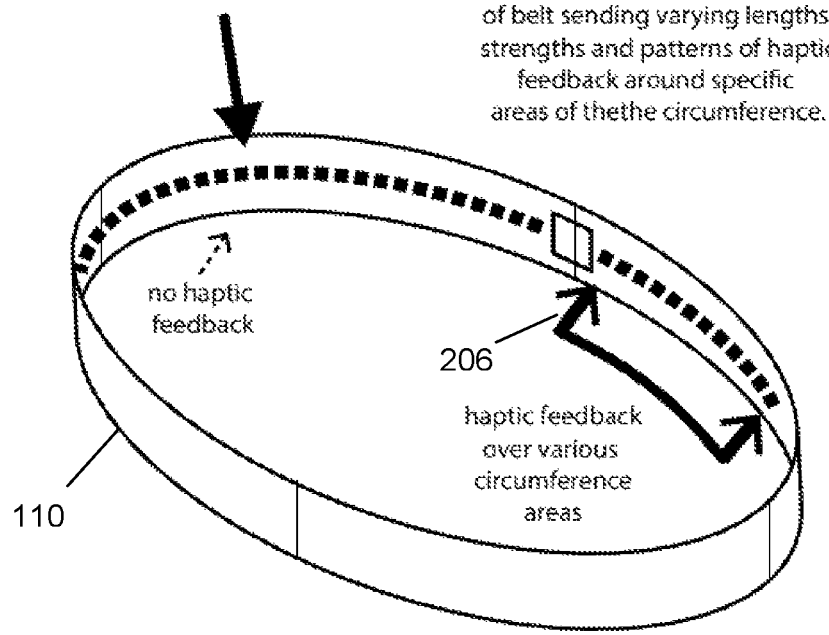
FIG. 4B illustrates a haptic feedback array that surrounds the entire intelligent belt consistent with certain embodiments of the present invention.

Turning now to FIG. 4B shows an embodiment where a haptic feedback array 205 surrounds the entire intelligent belt 110. Individual elements in the array or groupings of elements 206 can be activated, including patterns of activation, to convey various forms of posture adjustment that are needed as real time feedback communications to the user.

Figure 4C:
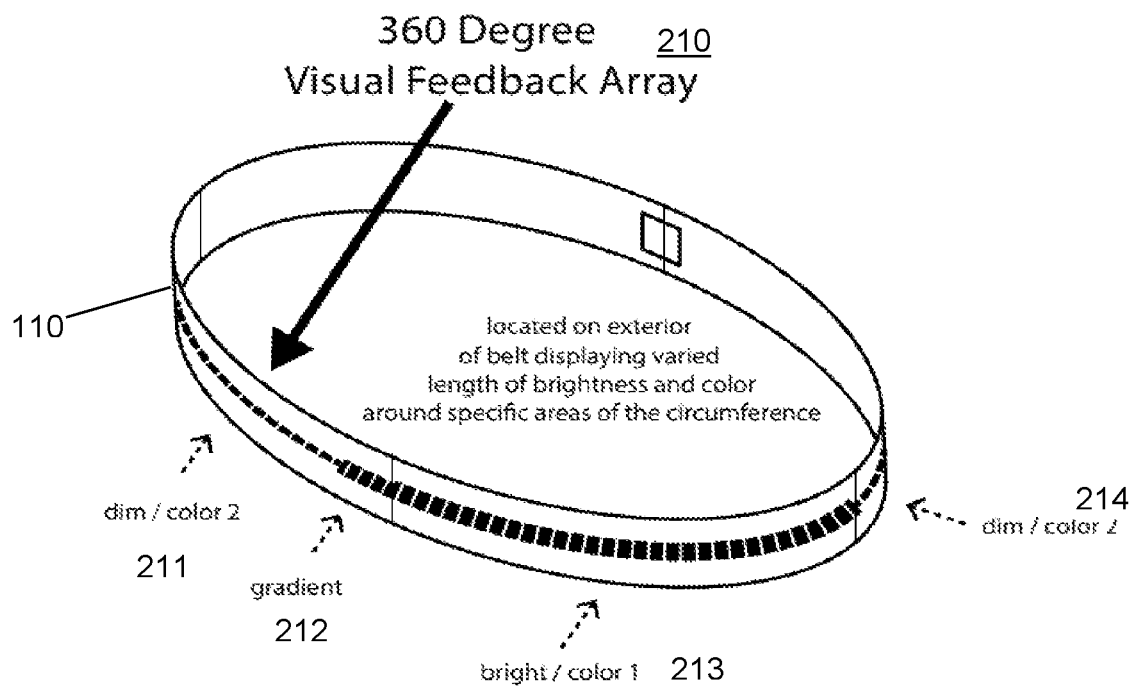
FIG. 4C illustrates a visual feedback array that surrounds the entire intelligent belt consistent with certain embodiments of the present invention.

Turning now to FIG. 4C shows an embodiment where a visual feedback array 205 surrounds the entire intelligent belt 110. Individual elements in the array or groupings of elements can be activated, including patterns of activation, to convey various forms of posture adjustment feedback communication that may be needed. In a non-limiting example, the severity of correction needed can be conveyed to the user by using a grouping of visual elements that transition through groups which are dimly lit 211, gradually brighter 212, full brightness 213, and then gradually dimmer 214. This progression of feedback visual communications may include the possibility that visual elements in various groups differ in coloring by group.

Figure 4D:
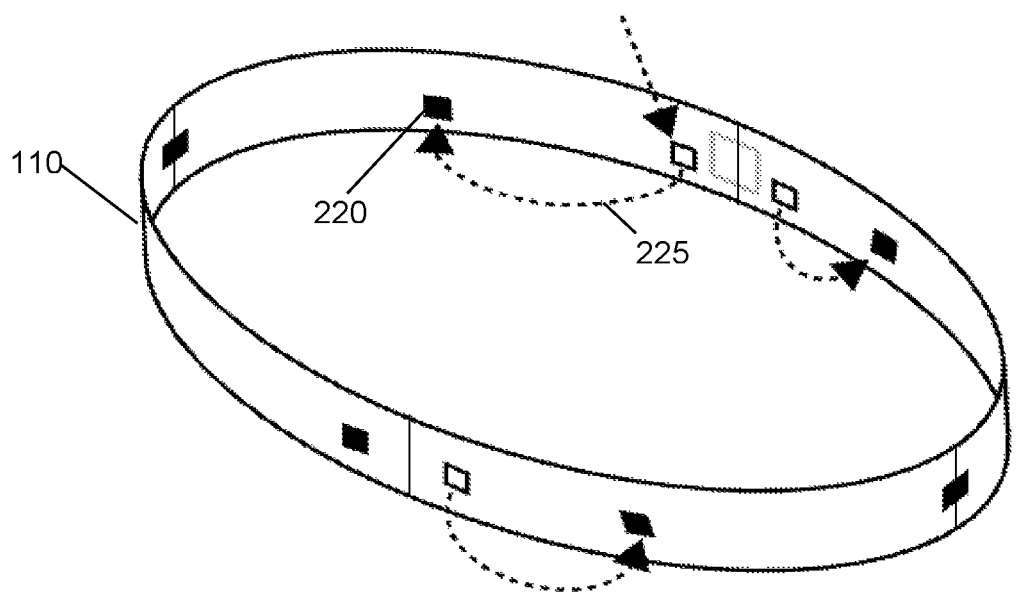
FIG. 4D illustrates a feedback element starting at an initial position on the intelligent belt to be moved to an alternative position consistent with certain embodiments of the present invention.

Turning now to FIG. 4D illustrates that some embodiments of the invention may allow a feedback element starting at an initial position 215 on the intelligent belt 110 to be moved 225 to an alternative position 220.

Figure 4E:
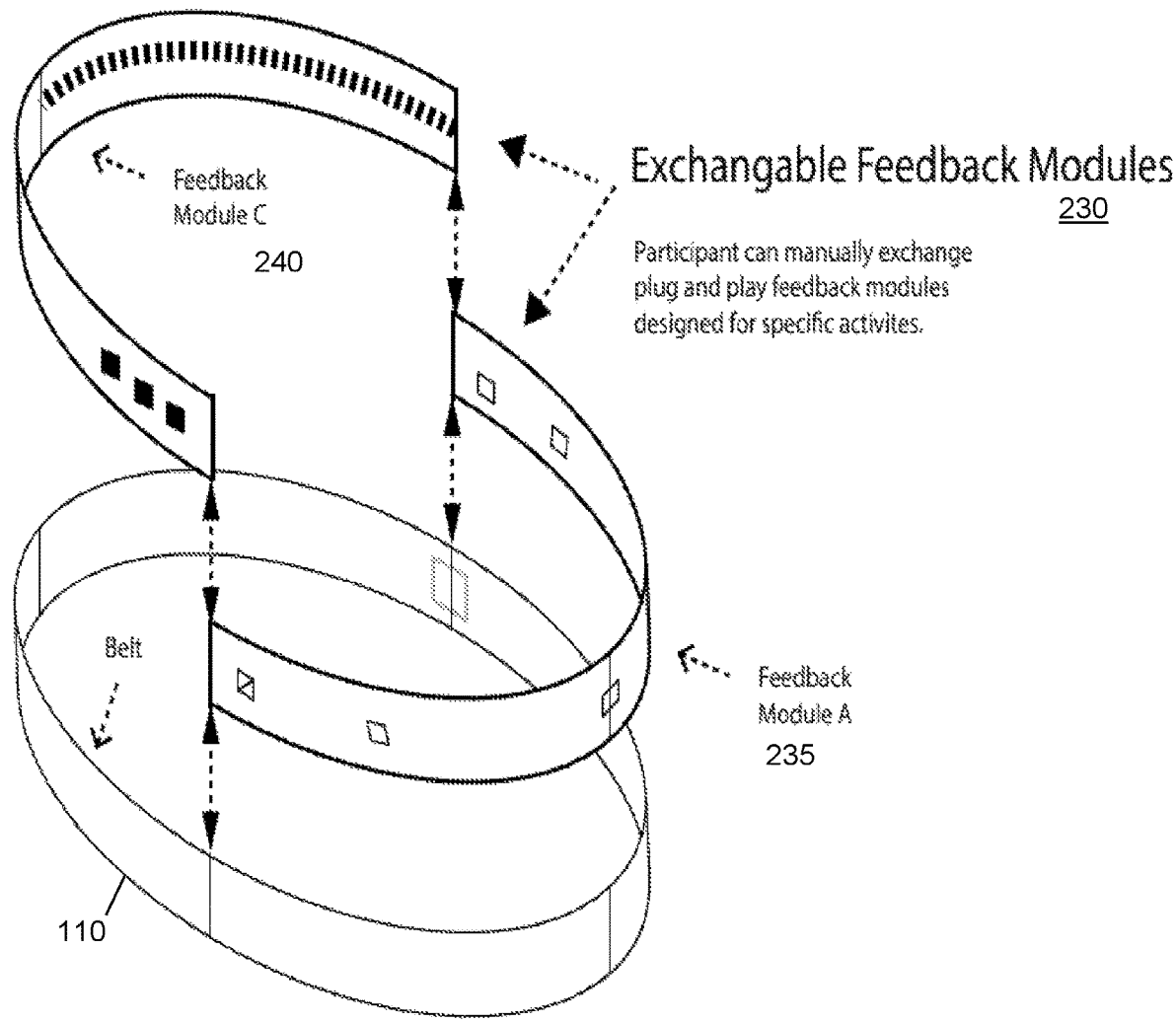
FIG. 4E illustrates an intelligent belt may comprise replaceable feedback modules consistent with certain embodiments of the present invention.

Turning now to FIG. 4E illustrates that in some embodiments the intelligent belt 110 may comprise replaceable feedback modules 230 such that all or a portion of the feedback elements on the belt may be removed and replaced with a different type of feedback elements. In this figure, a feedback module 235 of type A, where an initial feedback type may be defined as haptic feedback, is being combined with a feedback module 240 of type C, where the initial feedback type may be defined as visual indicators, to customize the intelligent belt 110 for a specific drill.

Figure 5:
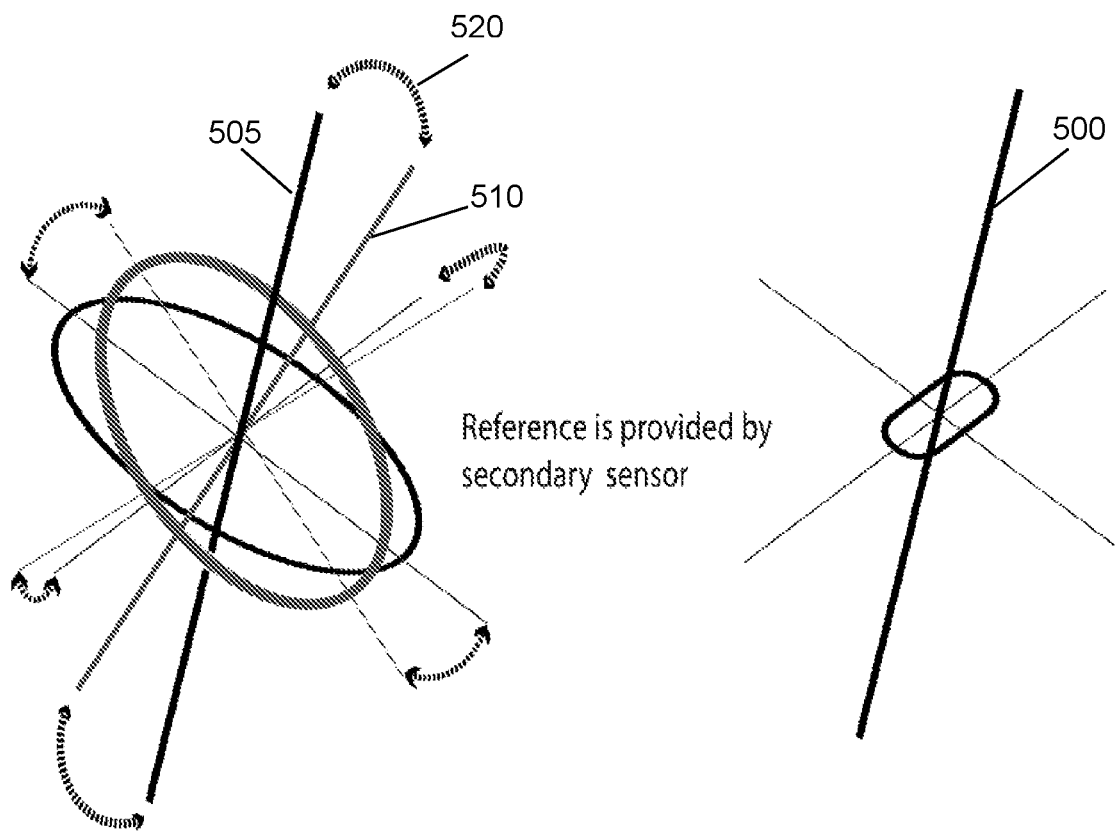
FIG. 5 illustrates how a secondary sensor can be used to correct belt sensor readings consistent with certain embodiments of the present invention.

Turning now to FIG. 5, this figure illustrates how a secondary sensor can be used to correct intelligent belt position sensor readings consistent with certain embodiments of the present invention. In an exemplary embodiment, the orientation of an axis 510 as determined by the position sensor on the intelligent belt 110 may not be an accurate indication of the true orientation of the hips along that axis. When the secondary sensor 115 readings are known the intelligent belt 110 the orientation of a secondary sensor axis 500 may determine a new frame of reference 505 for the intelligent belt 110. When the intelligent belt's 110 position sensor reading 510 is compared to the new frame of reference 505 the true amount of hip tilt 520 can be determined.

Figure 6:
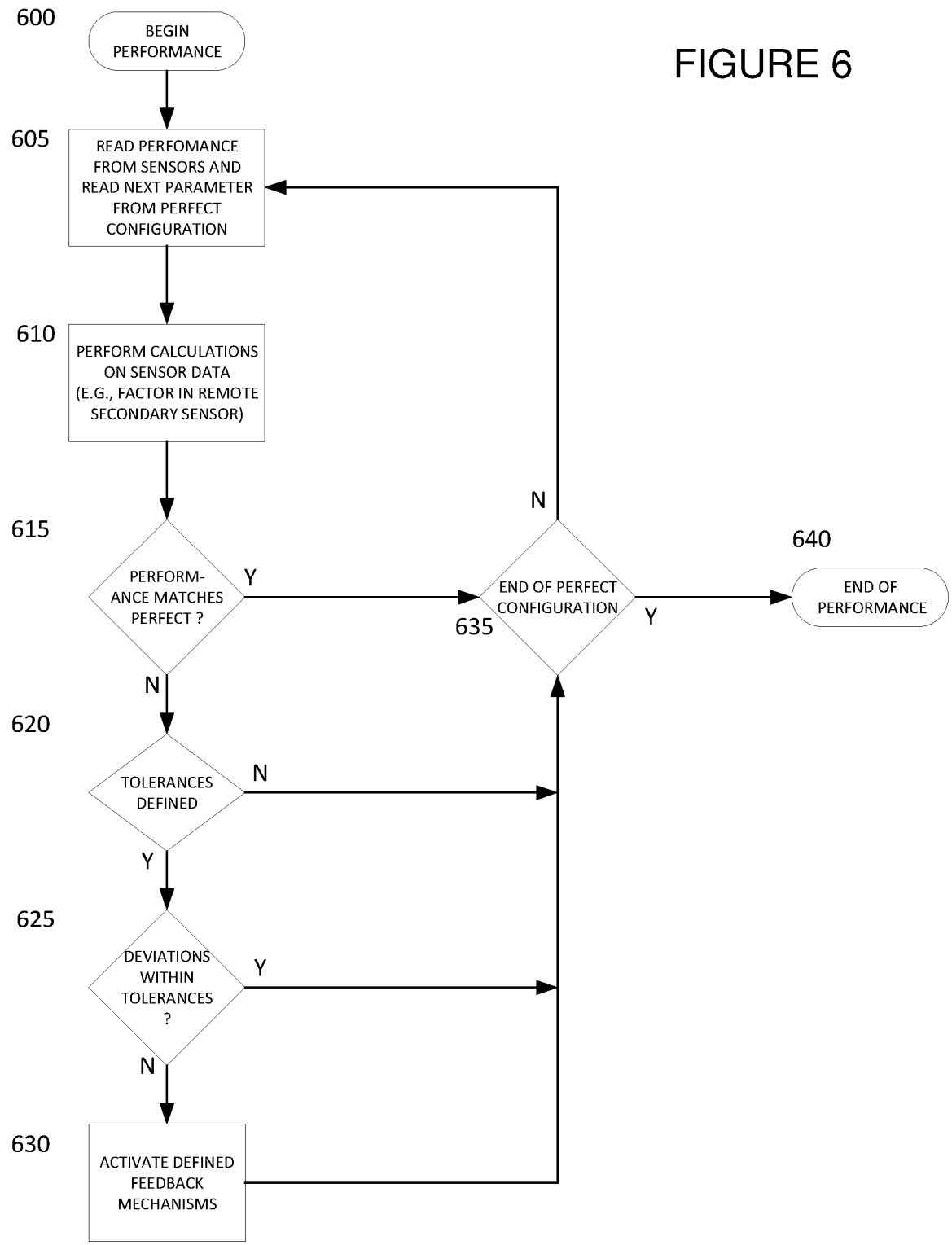
FIG. 6 is a flow diagram for a main controller loop while a drill is being performed consistent with certain embodiments of the present invention.

Turning now to FIG. 6, this figure is a flow diagram for the main controller loop while a drill is being performed consistent with certain embodiments of the present invention. In an exemplary embodiment, a performance begins at block 600. At block 605, the controller may read the next set of readings from sensors on the intelligent belt and the secondary sensor, if available. The controller may also read the next set of parameters from an expanded configuration that describes a perfect performance for the drill, maneuver, configuration or motion being performed by the user. At block 610, the controller completes any calculations necessary to adjust intelligent belt readings to correct for inclined and/or variable surfaces as determined by the secondary sensor, if available. At block 615, a comparison is made to see if the parameters of the user performance for the drill, maneuver, configuration, or motion match the perfect parameters as previously defined. If the performance parameters match, an exit to block 635 is taken and the controller checks to see if the end of the perfect configuration, signifying the end of the position, motion, maneuver, or drill described by the perfect configuration, has been reached. If the end of the configuration has not been reached, an exit to block 605 causes a loop during which the next set of sensor readings will be acquired, corrected, and compared to the next set of perfect parameters.

If the comparison at block 615 determines that the performed parameters do not match the perfect parameters, then at block 620 the controller checks to see if the configuration defines tolerance for this part of the performance. In a non-limiting example, the case that some portions of the performance may be performed without regard to specific orientations, positions, motions, velocities, or any other actions performed by a user. If no tolerances are defined for the mismatched parameters, then an exit occurs to block 635.

If the check at block 620 determines that tolerances do exist, then at block 625 the controller calculates the deviation between performed and perfect parameters and determines whether or not the observed deviation falls within the allowable tolerances. If the deviation falls within tolerances then an exit to block 635 is taken.

If the check at block 625 determines that the observed deviations are outside of allowable tolerances, then at block 630 the controller uses the feedback definition in the perfect configuration to activate one or more feedback mechanisms, where feedback may be provided to the user through visual, aural, or haptic feedback mechanisms. Activation of one or more of the available feedback mechanisms may inform the person wearing the intelligent belt or an observer of the specific nature of an imperfect performance. After activating feedback mechanisms an exit to block 635 allows the loop to continue.

If block 635 determines that the end of the perfect configuration has been reached and the controller may await input from the user indicating what task to perform next or it may resume any default tasks that have not been completed or have been programmed to be performed when no higher priority task is in process.

Figure 7:
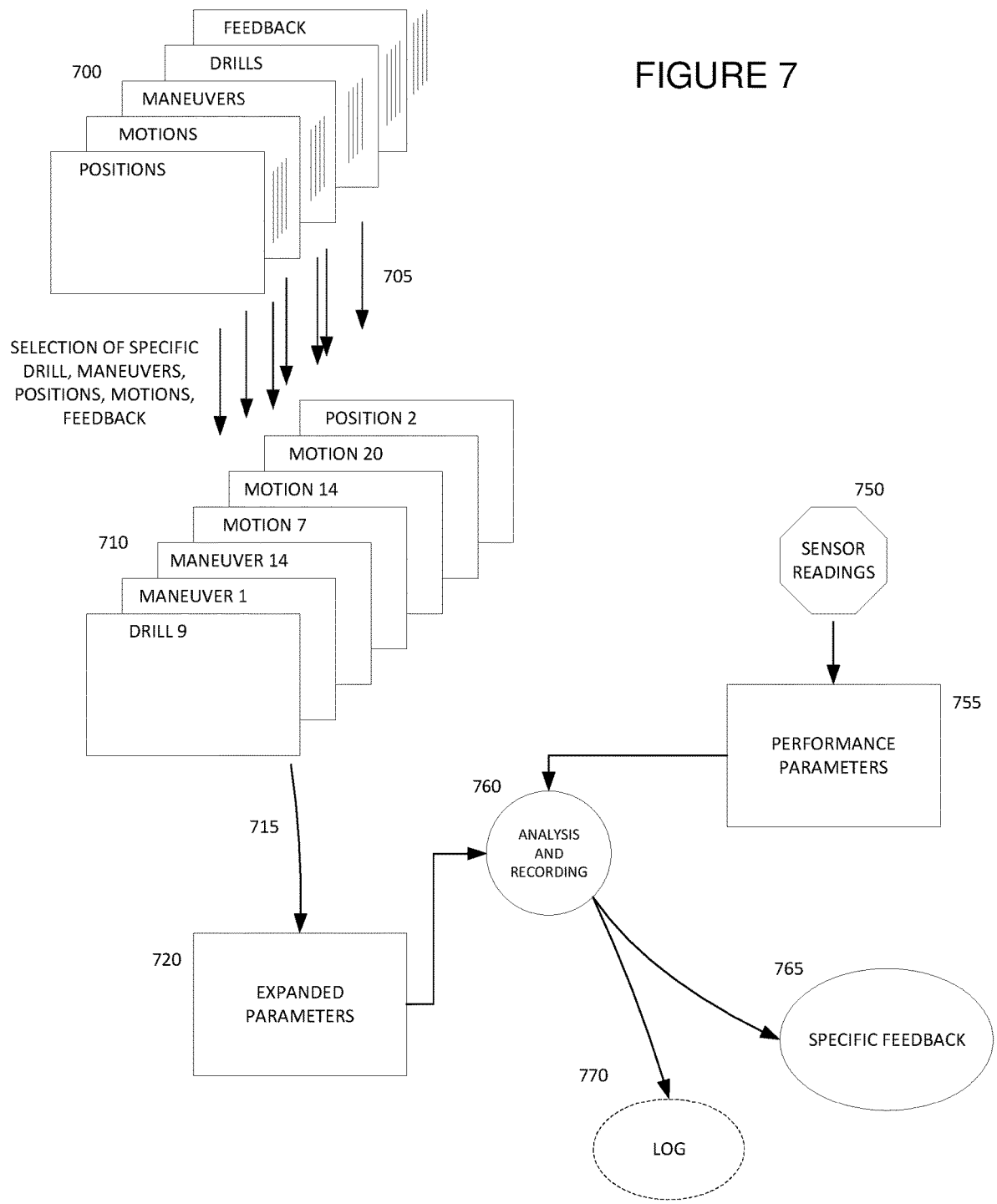
FIG. 7 illustrates the flow of some information consistent with certain embodiments of the present invention.

Turning now to FIG. 7, this figure illustrates the flow of some information consistent with certain embodiments of the present invention. In an exemplary embodiment, a number of configurations 700 have been previously defined or acquired by the user. In some cases a configuration may represent a collection of parameters describing a perfect performance of a position, motion, maneuver, or drill.

In some cases a configuration may represent a collection of attributes regarding the activation of feedback for a specific correction of which the user needs to be aware. Some configurations such as positions and motions may contain parameters with associated tolerances and may also contain references to feedback configurations that should be invoked if tolerances are violated. The user may select 705 a position, motion, maneuver, or drill to perform and that selection may cause a number of referenced configurations to also be selected 705.

In a non-limiting example, if the user selects drill 9 it may be the case that drill 9 is a sequence of maneuver 1 followed by maneuver 14. Maneuver 1 may be defined as motion 7 followed by motion 14. Maneuver 14 may be defined as motion 20 followed by position 2. Therefore, when drill 9 is selected the controller may determine that a complete set 710 of configurations for drill 9, maneuver 1, maneuver 14, motion 7, motion 14, motion 20, and position 2 must be selected and made available for further use. Next, the controller must expand 715 these configurations. Expansion is defined as drills that will be replaced by the sequence of maneuvers, positions and motions of which the drill is composed. In this non-limiting example, maneuvers will in turn be replaced by the specific positions and motions to which they refer, and positions and motions will be replaced in turn by the specific parameters that describe the detailed movements from start to finish.

As configured, a set of expanded parameters 720 is a complete set of parameters in a temporal ordering that describe the position, orientation, direction, velocity, and all additional parameters for sensor movements through an entire perfect performance for the completed drill. During the expansion of configurations into parameters, the controller may create and preserve metadata so that it will be possible to determine which configuration, and what portion of the configuration, gave rise to a particular set of parameters. The metadata may also preserve names that were applied to the various positions, motions, maneuvers, and drills, names applied to feedback definitions, references to the temporal indices of parameters within a motion, configuration, maneuver, or drill.

Subsequent to the completion of a set of fully expanded parameters 720, the controller may begin collecting sensor readings 750 from the intelligent belt and from the remote secondary sensor. After applying frame of reference corrections and possibly performing other calculations, the controller arrive at a set of performance parameters 755 which represents the current position, orientation, direction, velocity, etc of the user wearing the intelligent belt at that moment. The controller may then perform an analysis and record information 760 for later use. The analysis, at its most basic level, is a comparison of the performance parameters representing what is currently occurring in the actual performance with regard to what should be occurring in a perfect performance. If there is a deviation and the deviation is outside of allowable tolerance as defined by the configurations, then the controller may invoke specific feedback 765 as defined in the configurations. During the analysis and recording 760 phase, the controller may also save, in a log 770, information which would be useful in later review of each user performance. In a non-limiting example, the log may state the name of the drill, reference to specific feedback definitions that were invoked and the time references of when they were invoked, parameter values at points in time when feedback was given, and any other parameter that is defined and configured for the user performance. In this example, the log entries for a particular user performance may be retrieved to review recorded information records such as "While performing 'Floor exercise #17' at time index 3:45 during the performance of the 2nd 'Cartwheel' the user leaned "Too Far Back" by 5 degrees. At time index 5:15 at the end of the 'Forward Flip' the user 'Landed Too Hard'."

Figure 8:
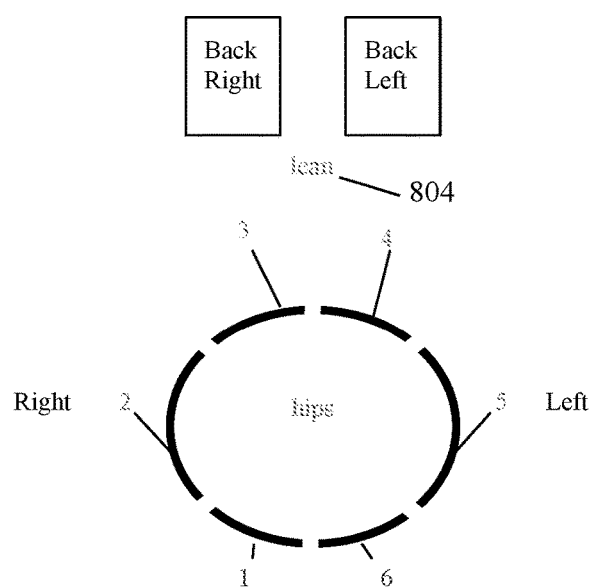
FIG. 8 illustrates positioning of sensors within a sensor belt consistent with certain embodiments of the present invention.
Figure 8:
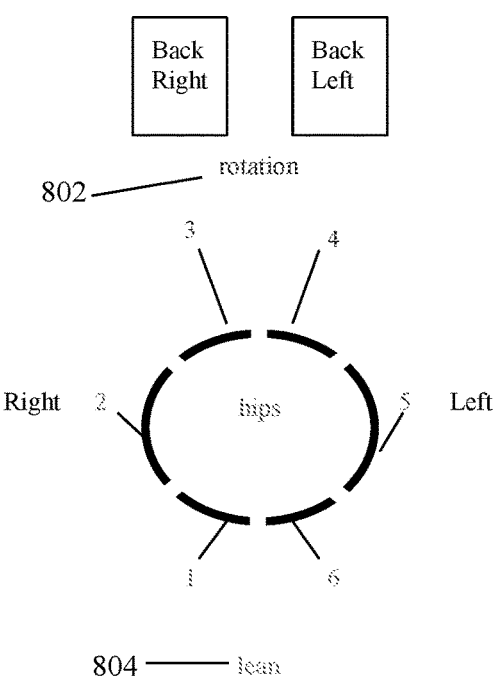

Turning now to FIG. 8, this figure illustrates positioning of sensors within a sensor belt consistent with certain embodiments of the present invention. In an exemplary embodiment, because every waist is different in terms of size, feedback must be consistent across all users by taking the size of the belt into account when determining sensor zones to activate and with which to communicate. Upon wearing the belt the system sensors associated with the belt and installed within the belt will determine the current length of the belt based upon the diameter. The system may then divide the length into six consistent feedback zones (1, 2, 3, 4, 5, 6) maintaining the same relative place for every user.

These six feedback zones (1, 2, 3, 4, 5, 6) are part of the system configuration for providing active feedback to the user while wearing the belt. In a non-limiting example, a position that requires level hips is conceptually designed to send feedback to the lowest hip when the position is unacceptable. This position may be configured to send visual and haptic feedback to feedback zone 2, the right, and feedback zone 5, the left, of the belt. As the user attempts a position, if the right hip lowers the system may send feedback to feedback zone 2.

In this embodiment, relative zones being applied over different diameters enables consistent feedback delivery to the same relative location on the user's right hip regardless if they have a waist size of 23 or 36. Also, the zoning allows a configuration to send rotation feedback 802 and lean feedback 804 to alternate locations. In the figure, lean feedback 804 may be sent to feedback zones 3 and 4 while rotation feedback 802 may be sent to feedback zones 1 and 6. In cases where feedback for lean 804 was best delivered to the front of the belt the configurations could be modified to send lean feedback 804 to the front of the belt over feedback zones 1 and 6 and rotation feedback 802 to the back of the belt over feedback zones 3 and 4.

While certain illustrative embodiments have been described, it is evident that many alternatives, modifications, permutations and variations will become apparent to those skilled in the art in light of the foregoing description.

I claim:

1. A system for providing physical activity feedback, comprising:
   a first sensor apparatus associated with a first user's first physical orientation, the first sensor apparatus comprising real-time, active visual, haptic, and auditory feedback mechanisms;
   a second sensor apparatus remote to said first user associated with a second physical orientation of an athletic apparatus in contact with the first user;
   one or more follow sensor apparatuses associated with one or more third party users where each third-party user is associated with one of said follow sensor apparatuses;
   the first sensor apparatus collecting in real-time first physical orientation data of said first user and the second sensor apparatus collecting in real-time second physical orientation data of said apparatus;
   a network capable communication capability establishing and maintaining a bi-directional data communication channel between the first sensor apparatus and the second sensor apparatus;
   a first software module associated with the second sensor apparatus operative to transmit the second physical orientation data in real-time from the second sensor apparatus to the first sensor apparatus utilizing the bi-directional data communication channel;
   a second software module associated with the first sensor apparatus operative to receive the second physical orientation data from the second sensor apparatus and comparing the second physical orientation data with the first physical orientation data in real-time;
   said second software module associated with the first sensor apparatus operative to analyze the comparison data in real-time to determine angular differences between the first physical orientation and the second physical orientation as changes in the first physical orientation and second physical orientation occur, and create a combination of visual, auditory, and haptic adjustment feedback signals;
   said second software module associated with the first sensor apparatus transmitting in real-time the current physical orientation of the first sensor apparatus to each of the one or more follow sensor apparatuses;
   said comparison permitting one of said third party users associated with a follow sensor apparatus to determine and match the position in real time of any positional changes made and held by said first user through a created combination of visual, auditory, and haptic adjustment feedback signals on each follow apparatus.

2. The system of claim 1, further comprising a wearable apparatus associated with the first sensor apparatus or the second sensor apparatus.

3. The system of claim 2, where the wearable apparatus is a belt, strap, or other article of clothing into which the first sensor apparatus or second sensor apparatus may be completely enclosed.

4. The system of claim 1, further comprising transmitting physical orientation information from the user after the user has adjusted the first physical orientation in response to the feedback signals.

5. The system of claim 1, where the first sensor apparatus is associated with the user and the second sensor apparatus remote to the user may be placed in a position associated with a surface or conveyance with which the user is in contact.

6. The system of claim 2, where the wearable apparatus is capable of being divided into a pre-determined number of sections, each section of which may be separately addressable by the system.

7. The system of claim 1, further comprising a recording apparatus that collects physical orientation data from the first sensor apparatus and the second sensor apparatus and stores the collected physical orientation data to an electronic storage apparatus.

8. The system of claim 7, where the stored collected physical orientation data for the first sensor apparatus or the second sensor apparatus may be retrieved from an electronic storage apparatus and transmitted to the first sensor apparatus or the second sensor apparatus to perform a comparison between the retrieved physical orientation data and physical orientation data newly collected by the first sensor apparatus and/or the second sensor apparatus.

9. The system of claim 7, where the collected physical orientation data may be associated with a position, a motion, a maneuver, and/or a drill, and where the collected physical orientation data for positions, motions, maneuvers and drills may be concatenated to a set of physical orientation data that provides feedback that permits the user to learn the movements represented by the collected physical orientation data by adhering to the feedback to adjust the user physical orientation such that the difference between the user physical orientation and the collected physical orientation decreases when compared.

10. A method for providing physical activity feedback, comprising:
providing a first user with a first sensor apparatus associated with the first user's first physical orientation, the first sensor apparatus comprising real-time, active visual, haptic, and auditory feedback mechanisms;
providing a second sensor apparatus remote to first user associated with a second physical orientation of an athletic apparatus in contact with said user;
one or more follow sensor apparatuses associated with one or more third party users where each third-party user is associated with one of said follow sensor apparatuses;
the first sensor apparatus collecting in real-time first physical orientation data of said first user and the second sensor apparatus collecting in real-time second physical orientation data of said apparatus;
establishing a network capable communication capability and maintaining in real-time a bi-directional data communication channel between the first sensor apparatus and the second sensor apparatus;
transmitting the second physical orientation data from the second sensor apparatus in real-time to the first sensor apparatus utilizing the bi-directional data communication channel;
the first sensor apparatus receiving the second physical orientation data from the second sensor apparatus and comparing the second physical orientation with the first physical orientation in real-time;
analyzing the comparison data in real-time to determine angular differences between the first physical orientation and the second physical orientation as changes in the first physical orientation and second physical orientation occur, and create a combination of visual, auditory, and/or haptic adjustment feedback signals;
transmitting in real-time the current physical orientation of the first sensor apparatus to each of the one or more follow sensor apparatuses;
said comparison permitting one of said third party users associated with one of said follow sensor apparatuses to determine and match the position in real time of any positional changes made and held by said first user through a created combination of visual, auditory, and haptic adjustment feedback signals on each follow apparatus.

11. The method of claim 10, further comprising a wearable apparatus associated with the first sensor apparatus or the second sensor apparatus.

12. The method of claim 11, where the wearable apparatus is a belt, strap, or other article of clothing into which the first sensor apparatus or second sensor apparatus may be completely enclosed.

13. The method of claim 10, further comprising transmitting physical orientation information from the user after the user has adjusted the first physical orientation in response to the feedback signals.

14. The method of claim 10, where the first sensor apparatus is associated with the user and the second sensor apparatus is placed in a position associated with a surface or conveyance with which the user is in contact.

15. The method of claim 11, where the wearable apparatus is divided into a pre-determined number of sections, each section of which is separately addressable by the system.

16. The method of claim 10, further comprising a recording apparatus that collects physical orientation data from the first sensor apparatus and the second sensor apparatus and stores the collected physical orientation data to an electronic storage apparatus.

17. The method of claim 16, where the stored collected physical orientation data for the first sensor apparatus or the second sensor apparatus may be retrieved from an electronic storage apparatus and transmitted to the first sensor apparatus or the second sensor apparatus to perform a comparison between the retrieved physical orientation data and physical orientation data newly collected by the first sensor apparatus and/or the second sensor apparatus.

18. The method of claim 16, where the collected physical orientation data may be associated with a position, a motion, a maneuver, and/or a drill, and where the collected physical orientation data for positions, motions, maneuvers and drills may be concatenated to a set of physical orientation data that provides feedback that permits a user to learn the movements represented by the collected physical orientation data by adhering to the feedback to adjust the user physical orientation such that the difference between the user physical orientation and the collected physical orientation decreases when compared.

\* \* \* \* \*